United States Patent
Mehanian et al.

(10) Patent No.: US 10,580,035 B2
(45) Date of Patent: Mar. 3, 2020

(54) PROMOTION SELECTION FOR ONLINE CUSTOMERS USING BAYESIAN BANDITS

(71) Applicant: Staples, Inc., Framingham, MA (US)

(72) Inventors: Courosh Mehanian, Redmond, WA (US); Timothy Wee, Burlingame, CA (US); Karthik Kumara, Santa Clara, CA (US)

(73) Assignee: Staples, Inc., Framington, MA (US)

( * ) Notice: Subject to any disclaimer, the term of this patent is extended or adjusted under 35 U.S.C. 154(b) by 1047 days.

(21) Appl. No.: 14/723,360

(22) Filed: May 27, 2015

(65) Prior Publication Data

US 2016/0350802 A1    Dec. 1, 2016

(51) Int. Cl.
*G06Q 30/02* (2012.01)

(52) U.S. Cl.
CPC ..... *G06Q 30/0254* (2013.01); *G06Q 30/0269* (2013.01)

(58) Field of Classification Search
CPC .................................................. G06Q 30/0254
See application file for complete search history.

(56) References Cited

U.S. PATENT DOCUMENTS

| | | | |
|---|---|---|---|
| 8,458,103 B2 | 6/2013 | Brooks et al. | |
| 8,666,909 B2 | 3/2014 | Pinckney et al. | |
| 2006/0271441 A1 | 11/2006 | Mueller et al. | |

FOREIGN PATENT DOCUMENTS

WO    WO 2014001908 A1    3/2014

OTHER PUBLICATIONS

Wiley Encyclyopedia of Computer Science and Engineering (2009) (Year: 2009).*
Rossi, Peter (University of Chicago), book "Bayesian Statistics and Marketing" (2005) (Year: 2005).*
Liu, J. (2001) Monte Carlo Strategies in Scientific Computing. New York Springer-Verlag Chapters 5, 6. (Year: 2001).*
Agrawal et al., "Analysis of Thompson sampling for the multi-armed bandit problem." Apr. 9, 2012 (21 pages).
Davidson-Pilon, "Multi-Armed Bandits" Apr. 6, 2013 (8 pages).
Rothschild, "A Two-Armed Bandit Theory of Market Pricing" Sep. 10, 2973, Journal of Economic Theory (18 pages).

(Continued)

*Primary Examiner* — Arthur Duran
*Assistant Examiner* — Breffni Baggot
(74) *Attorney, Agent, or Firm* — Patent Law Works LLP

(57) ABSTRACT

Technology for selecting promotion(s) to display in a page of an application for display to a user is described. An example method includes determining a promotion for a product; calculating for the promotion a posterior distribution of a user-action probability reflecting estimates for a user response to a display of the promotion for the product on a computing device of the user; determining the posterior distribution as collapsing beyond a certain threshold; responsive thereto, calculating an uncollapsed posterior distribution of the user-action probability reflecting modified estimates for the user response to the display of the promotion for the product on a computing device of the user; storing the uncollapsed posterior distribution of the user-action probability in a response database; and determining whether to select the promotion from the promotion database for display on a computing device of the user based on the modified estimates.

13 Claims, 15 Drawing Sheets

(56) References Cited

OTHER PUBLICATIONS

Strens, "A Bayesian Framework for Reinforcement Learning" Proceedings of the Seventeenth International Conference on Machine Learning, Stanford University, California, Jun. 29, 2000 (8 pages).
Vermorel et al., "Multi-Armed Bandit Algorithms and Empirical Evaluation" Machine Learning: ECML 2005. Springer Berlin Heidelberg (12 pages).
Contextual Bandits, "Machine Learning (Theory)" Oct. 24, 2007 (8 pages).
Li, et al. "A Contextual-Bandit Approach to Personalized News Article Recommendation." Apr. 26, 2010 (10 pages).
Scott, "A Modern Bayesian Look at the Multi-Armed Bandit", Aug. 9, 2010 (20 pages).
Chapelle, et al., "An Empirical Evaluation of Thompson Sampling", 2011 (9 pages).
Dudik, et al., "Efficient Optimal Learning for Contextual Bandits," 2011 (20 pages).
White, book "Bandit Algorithms for Website Optimization", www.allitebooks.com, 2013 (86 pages).
Tang, et al., "Automatic Ad Format Selection via Contextual Bandits" 2013 (8 pages).
Stucchio, "Bayesian Bandits—optimizing click throughs with statistics (http://chrstucchio.com/blog/2013/bayesian_bandit.html)" Jul. 8, 2013 (10 pages).
Li, "Generalized Thompson Sampling for Contextual Bandits", Cornell University Library, Computer Science Learning, Oct. 27, 2013 (2 pages).
Splitforce.com, "Mobile App Auto-Optimization", Splitforce, Inc., https://splitforce.com/resources/auto-optimization, Aug. 31, 2015 (14 pages).
Feldman, "Bandits for Recommendation Systems", Engineering Blog, Jun. 2, 2014 (12 pages).
Feldman, "Recommendations with Thompson Sampling", Engineering Blog, Jun. 5, 2014 (12 pages).
Feldman, "Personalization with Contextual Bandits", Engineering Blog, Jun. 11, 2014 (9 pages).
Wikipedia, "Thompson sampling", https://en.wikipedia.org/wiki/Thompson_sampling, Jun. 11, 2014 (4 pages).
Langford, "Contextual Bandit Example", Aug. 28, 2014, GitHub (3 pages).
The BayesianWitch Blog, "The S That Determines All Conversions (ever) (/blog/2014/effectivefrequency.html)" Sep. 22, 2014 (19 pages).
Davidson-Pilon, Chapter 6 "Priorities" of "Bayesian Methods for Hackers", https://github.com/CamDavidsonPilon/Probabilist Programming-and-Bayesian-Methods-for-Hackers, May 22, 2013 (40 pages).

* cited by examiner

PROMOTION SELECTION FOR ONLINE CUSTOMERS USING BAYESIAN BANDITS

BACKGROUND

1. Field of the Art

The present specification generally relates to the field of selecting promotions for display to customers via a computer network, such as the Internet. More specifically, the present specification relates in some cases to a technology for selecting one or more promotions to be presented to online customers using Bayesian bandits.

2. Description of the Related Art

A developer of a website is often faced with the decision of which version of an advertisement (ad) to place on a webpage. Suppose, there are two versions of the ad, a red version A and a blue version B. The developer wishes to place the version of the ad that will garner the most clicks, but does not know in advance which version that is. The traditional approach is to run an A/B test: Each time the page is served, a random choice is made about whether to display the red version or the blue version of the ad, with a 50/50 chance of either version being displayed. The A/B test proceeds for a period of time, during which time the click-through rate (CTR) of each of the versions is measured. Once the A/B test is complete, the version of the ad with the highest measured CTR is displayed thereafter.

But questions may still remain: Was the A/B test run for a sufficient period of time to acquire enough data to make a confident measurement of the click-through rate of the ads? With insufficient data, random variation in the click-through rates can result in the inferior ad being chosen over the superior one, a decision which will negatively impact future performance. On the other hand, another question that may arise: Was the A/B test run for too long a period? Because the superior and the inferior ads are shown during the A/B test, pages served with the inferior ad can result in missed clicks. This is what motivates the name "regret" that is given to performance measures of reinforcement learning algorithms. A further question may also be raised: What if the click-through rate varies over time? Suppose that the blue ad comes out on top in an A/B test that was run in June. If the designer runs the blue ad for the rest of the year, there may be opportunity costs associated with potentially higher click rates for the red ad in December. This leads to further questions: Should A/B tests be run periodically? And if yes, then how often? How long? Existing advertisement selection procedures fail to provide optimal solutions to these questions.

SUMMARY

According to one innovative aspect of the subject matter described in this disclosure, a method may include determining a promotion for a product, the promotion being retrievable from a promotion database and provideable for display to a user; calculating for the promotion a posterior distribution of a user-action probability reflecting estimates for a user response to a display of the promotion for the product on a computing device of the user; determining the posterior distribution as collapsing beyond a certain threshold; responsive to determining the posterior distribution as collapsing, calculating, using a set of formulas, an uncollapsed posterior distribution of the user-action probability reflecting modified estimates for the user response to the display of the promotion for the product on a computing device of the user, the set of formulas being adapted to prevent the uncollapsed posterior distribution from collapsing beyond the certain threshold; storing the uncollapsed posterior distribution of the user-action probability in a response database; and determining whether to select the promotion from the promotion database for display on a computing device of the user based on the modified estimates for the user response to the display of the promotion for the product on a computing device of the user.

In another example, a method may include calculating a set of posterior distributions for a set of promotions; generating samples representing user-action probabilities for the promotions from the set of posterior distributions; analyzing features associated with the set of promotions and determining similarity values between two or more promotions; determining a set of diverse promotions from the set of promotions to include in a page of a user application for display to a user based on the similarity values and certain user-action probabilities associated with the set of diverse promotions; generating the page including the set of diverse promotions; and providing the page for display by a computer device of the user.

Further, innovative aspects include various additional features and operations associated with the above and following aspects and may further include, but are not limited to corresponding systems, methods, apparatus, and computer program products.

The disclosure is particularly advantageous over existing solutions in a number of respects. By way of example and not limitation, the technology described herein allows a designer to maximize an overall quantitative business objective, such as expected revenue, margin, or total click-through rate using innovative rewards functions. The technology also helps to ensure diversity of advertisements that are provided for display based on a similarity measure between the available advertisements. The technology can further prevent the response rate distributions from becoming too narrow by introducing an innovative mathematical transformation to update distribution parameters.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the inventive subject matter.

BRIEF DESCRIPTION OF THE DRAWINGS

The specification is illustrated by way of example, and not by way of limitation in the figures of the accompanying drawings in which like reference numerals are used to refer to similar elements.

Figure 1:
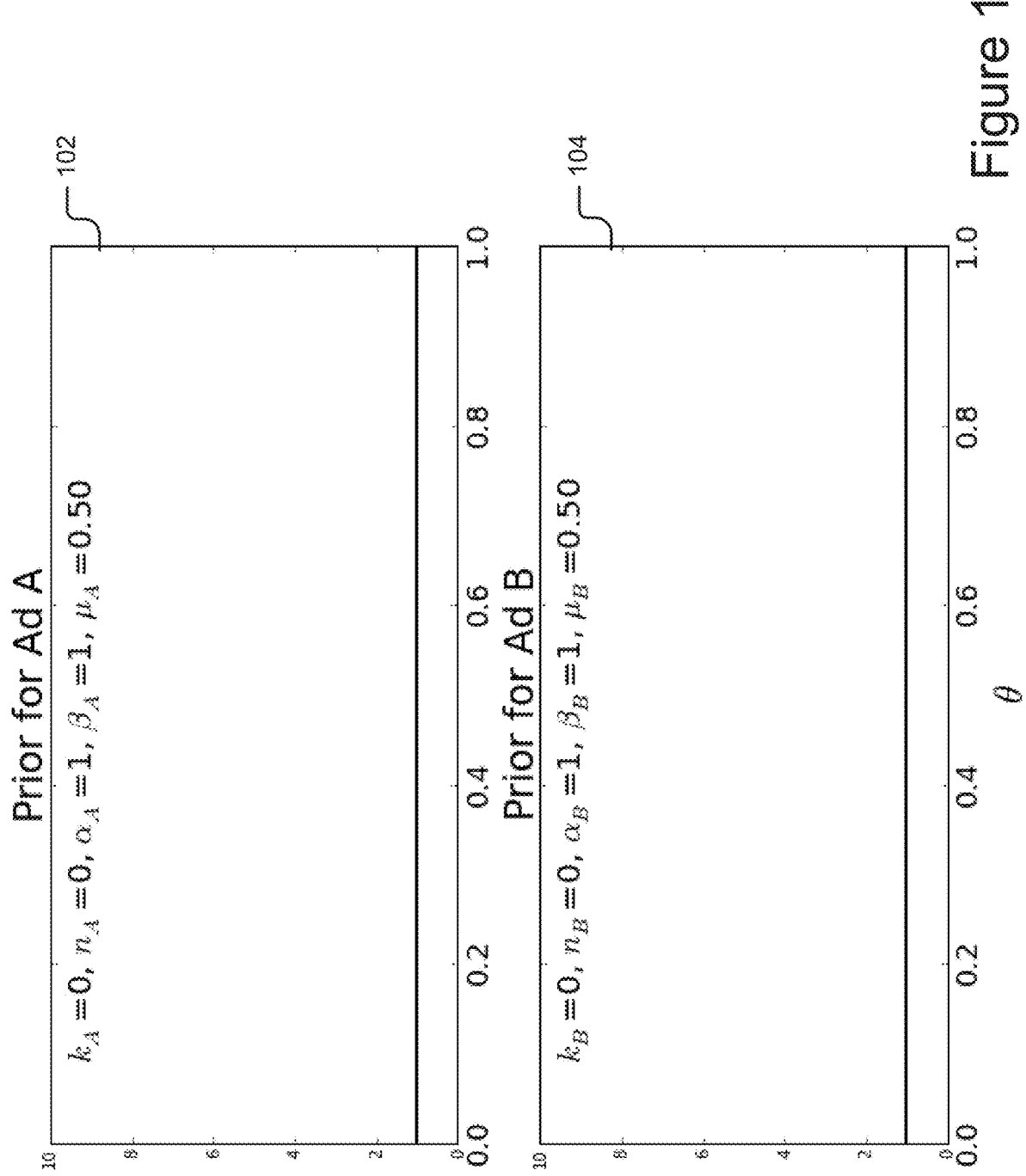
FIG. 1 illustrates example uninformative prior distributions for advertisements A and B.

The figures depict various example embodiments for purposes of illustration and not limitation. Further, it should be understood from the following discussion that alternative embodiments of the structures and methods illustrated herein may be employed without departing from the principles described herein.

DETAILED DESCRIPTION

The present techniques now will be described more fully with reference to the accompanying drawings, which illustrate specific example embodiments by which the subject matter of this disclosure may be practiced. The subject matter described herein may, however, be embodied in many different forms and should not be construed as limited to the embodiments set forth herein; rather, these embodiments are provided by way of illustration to aid in understanding of the techniques. The subject matter may be embodied as methods or devices and may take the form of an entirely hardware embodiment or an embodiment combining software and hardware aspects. The following detailed description is, therefore, not to be taken in a limiting sense.

Overview of Bayesian Bandits

The following description is given to aid in understanding the concept of promotion selection (e.g., advertisement selection, offer selection) using Bayesian Bandits, but this description is provided by way of example and should not be construed as limiting.

The tradeoff between measuring the click-through rate and displaying the current best advertisement is one example of the explore/exploit dilemma. Bayesian Bandit algorithms discussed herein provide an elegant and principled solution to the explore/exploit dilemma via the technique of Thompson Sampling. Rather than an arbitrary separation between an explore phase (A/B testing) and an exploit phase (displaying the best advertisement), the Bayesian Bandit algorithms (also simply referred to herein as Bayesian Bandits) model and update the click-through rates of the advertisements continuously. When asked to select an advertisement, the Bayesian Bandit algorithms draw samples from the click-through rate models and select the advertisement with a certain, such as the largest sampled value.

In general, the advertisement that provides the largest expected reward is generally selected, where the reward function may be chosen to maximize a chosen business objective, such as, but not limited to click-through rate (CTR), conversion rate, revenue, or margin.

The Bayesian Bandit can model each view or impression of an advertisement as a Bernoulli trial with probability parameter $\theta$, which is the click-through rate (CTR) for the advertisement. As the click-through rates are generally not known in advance, the probability parameters are considered to be random variables in their own right, governed by probability distributions. Under a Bayesian approach, the probability distribution for a random variable reflects the state of knowledge about the variable. The prior distribution represents the state of knowledge before any data is seen. The posterior distribution reflects the state of knowledge of the variable after accumulating evidence. The posterior distribution is calculated using Bayes' Formula:

$$P(\theta \mid X) = \frac{P(X \mid \theta) P\theta}{P(X)} \qquad \text{EQU. 1}$$

Here, X is the evidence (e.g., the data), $P(\theta|X)$ is the posterior distribution, $P(X|\theta)$ is the likelihood function, $P(\theta)$ is the prior distribution, and $P(X)$ is the probability of the evidence.

For Bernoulli trials, the evidence X may be expressed in the form: k successes out of n trials. In the example being considered, this translates to k clicks out of n impressions (views). The likelihood of observing k successes out of n Bernoulli trials is given by the Binomial distribution:

$$P(X|\theta) = \text{Binomial}(n,k;\theta) = C(n,k)\theta^k(1-\theta)^{n-k} \qquad \text{EQU. 2}$$

where $C(n,k)$ is the binomial coefficient, i.e., the number of combinations of n things taken k at a time.

The binomial coefficient may be expressed in terms of the factorial and Gamma functions as follows:

$$C(n,k) = \frac{n!}{k!(n-k)!} = \frac{\Gamma(n+1)}{\Gamma(k+1)\Gamma(n-k+1)}$$

The conjugate prior of the Binomial distribution is the Beta distribution, which is a convenient choice for the prior $P(\theta)$, both because of its flexibility in modeling different prior assumptions about the parameter $\theta$ and because it leads to an analytically tractable update rule. The Beta distribution is given by:

$$P(\theta) = \text{Beta}(\theta; \alpha_0, \beta_0) = \frac{\theta^{\alpha_0-1}(1-\theta)^{\beta_0-1}}{B(\alpha_0, \beta_0)} \qquad \text{EQU. 3}$$

Here, $\alpha_0, \beta_0$ are the shape parameters of the Beta distribution and $B(\alpha_0, \beta_0)$ is the Beta function, which acts as a normalizing factor.

The Beta function is defined by the formula:

$$B(\alpha_0, \beta_0) = \int_0^1 u^{\alpha_0-1}(1-u)^{\beta_0-1} du = \frac{\Gamma(\alpha_0)\Gamma(\beta_0)}{\Gamma(\alpha_0 + \beta_0)} \qquad \text{EQU. 4}$$

The mean $\mu$ of a Beta distribution with parameters $\alpha_0, \beta_0$ is given by $\alpha_0/(\alpha_0+\beta_0)$. The denominator in EQU. 1 is obtained by marginalizing (e.g., integrating) over all possible values of the probability parameter $\theta$. The denominator is given by the following integral:

$$P(X) = \int_0^1 P(X \mid \theta) P(\theta) d\theta = \frac{C(n,k)}{B(\alpha_0, \beta_0)} \int_0^1 u^{\alpha_0+k-1}(1-u)^{\beta_0+n-k-1} du \quad \text{EQU. 5}$$

Substituting P(X|θ) from EQU. 2, P(θ) from EQU. 3, and P(X) from EQU. 5 into EQU. 1, the following expression is obtained for the posterior distribution:

$$P(\theta \mid X) = \frac{\theta^{\alpha_0+k-1}(1-\theta)^{\beta_0+n-k-1}}{\int_0^1 u^{\alpha_0+k-1}(1-u)^{\beta_0+n-k-1} du} \quad \text{EQU. 6}$$

There is a complete cancellation of the normalizing factors in the numerator and denominator. Replacing the integral in EQU. 6 with the definition of the Beta function in EQU. 4, following equation is obtained:

$$P(\theta \mid X) = \frac{\theta^{\alpha_0+k-1}(1-\theta)^{\beta_0+n-k-1}}{B(\alpha_0+k, \beta_0+n-k)} \quad \text{EQU. 7}$$

Comparing EQU. 7 with EQU. 3, it may be apparent that the posterior distribution is also a Beta Distribution:

$$P(\theta|X) = \text{Beta}(\theta; \alpha_0+k, \beta_0+n-k) \quad \text{EQU. 8}$$

with shape parameters given by:

$$\alpha = \alpha_0 + k$$

$$\beta = \beta_0 + n - k \quad \text{EQU. 9}$$

EQU. 9 expresses what is regarded as an update rule to go from the prior distribution to the posterior distribution: the first shape parameter α is incremented by the number of observed successes, and the second shape parameter β is incremented by the number of observed failures.

The variance, $\sigma^2$, of a Beta distribution with parameters α, β is given by:

$$\sigma^2 = \frac{\alpha\beta}{(\alpha+\beta)^2(\alpha+\beta+1)} \quad \text{EQU. 10}$$

After substituting the expressions:

$$\mu = \alpha/(\alpha+\beta) \quad \text{EQU. 11a}$$

$$1-\mu = \beta/(\alpha+\beta) \quad \text{EQU. 11b}$$

and the relations in EQU. 9, the variance can be expressed as:

$$\sigma^2 = \frac{\mu(1-\mu)}{\alpha_0+\beta_0+n+1} \quad \text{EQU. 12}$$

as the number of impressions (n) increases, the variance decreases.

Non-Limiting Example Scenarios Illustrating Use of Bayesian Bandits

FIGS. 1-4 depict a series of simulations of the Bayesian Bandit distributions. By way of reference, in the description of these figures, as well as FIGS. 5 and 6, various components of the example system 700 described further below in reference to at least FIG. 7B are discussed, such as the ads management module 740, the distribution calculator 742, the distribution collapse avoidance module 746, the ads diversity module 750, and the revenue estimator 748 of the personalization server 730.

In the simulations shown in FIGS. 1-4, an uninformative prior of P(θ)=1 has been chosen. For example, a developer may have no prior knowledge of click-through rates of advertisements, and the developer can incorporate this lack of knowledge using the uninformative prior P(θ)=1, which corresponds to Beta($\alpha_0$=1, $\beta_0$=1). The simulations are drawn from Bernoulli distributions with known click-through rates: $\theta_A$=0.3 and $\theta_B$=0.22. In some cases, if the developer has previous knowledge of expected click-through rate of customers on the website, this information can be encoded in the prior distributions.

FIG. 1 depicts plots 102 and 104 of example uninformative prior distributions, calculated by the distribution calculator 742, for advertisements A and B, respectively at time t=0. Note that μ=½ for both the advertisements. The ads management module 740 may draw Samples $P_A$ and $P_B$ from the prior distributions $P_A(\theta_A)$ and $P_B(\theta_B)$, respectively, as calculated by the distribution calculator 742, to determine which advertisement to present to a user. Here, $\theta_A$ and $\theta_B$ are the click-through rates of advertisements A and B respectively. Since, initially, both distributions are the same, in requests based on these there is a 50/50 chance that sample $P_A$ will exceed sample $P_B$, and thus roughly equal numbers of two sets of advertisements are presented to users.

Figure 2:
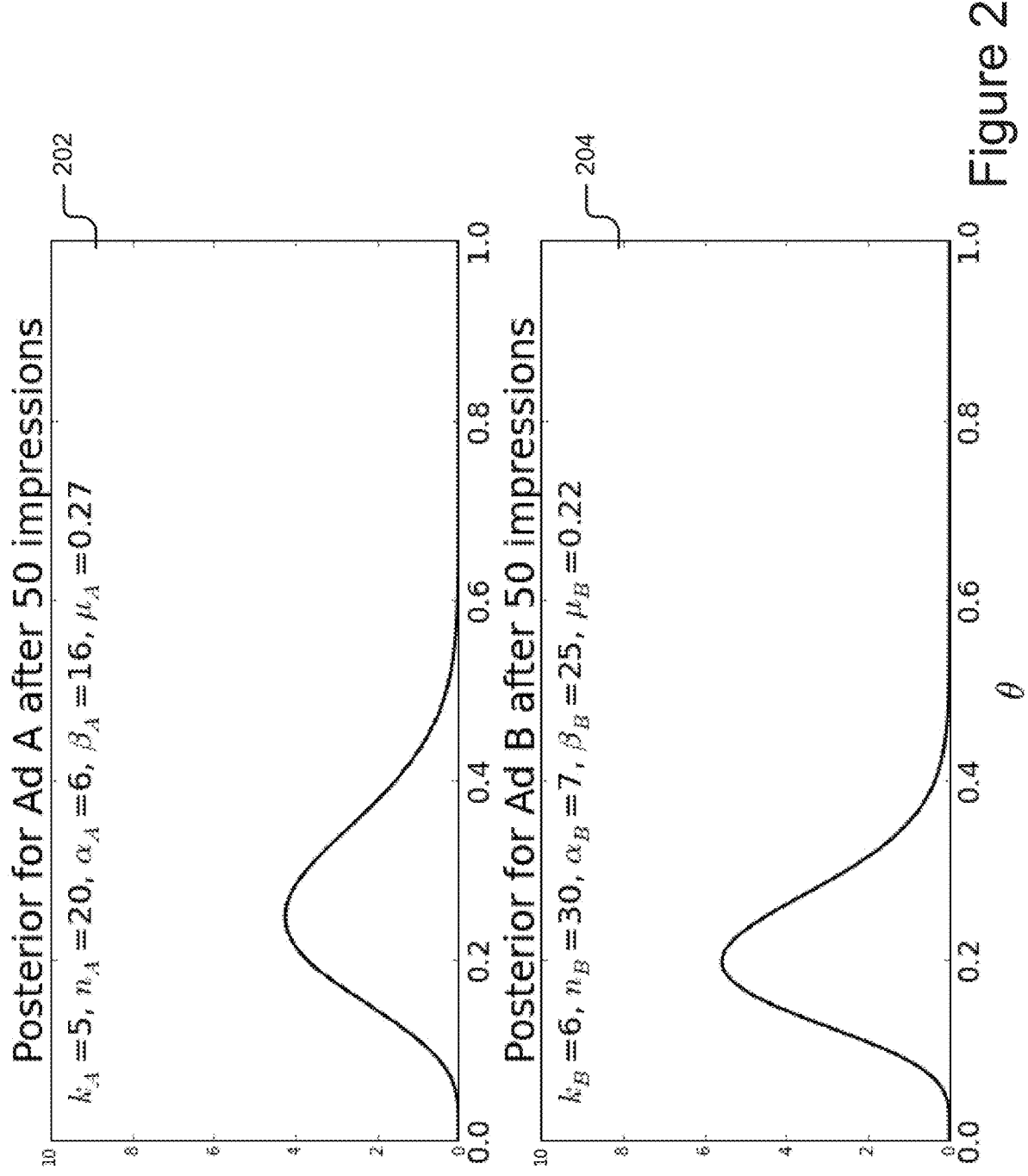
FIG. 2 illustrates example posterior distributions for advertisements A and B after 50 page views have been served.

FIG. 2 depicts plots 202 and 204 of example posterior distributions calculated by the distribution calculator 742 for advertisements A and B, respectively after a total of n=$n_A$+$n_B$=50 page views have been served. As depicted, the ads management module 740 served advertisement A $n_A$=20 times and served advertisement B has been served $n_B$=30 times. Out of these servings, as depicted, clickstream data used by the distribution calculator 742 to generate the distributions indicated that $k_A$=5 clicks are received from pages where advertisement A was served and $k_B$=6 clicks from pages where advertisement B was served. In addition, using the clickstream data, the distribution calculator 742 determined an average click-through rate of $\mu_A$=0.27 for advertisement A and an average click-through rate of $\mu_B$=0.22 for advertisement B.

The example illustrated in FIG. 2 describes an embodiment where distribution calculator 742 performs Bayesian posterior updates in batch mode (e.g., after a certain number of pages have been served, a certain amount of time has elapsed, etc.). In other embodiments, the distribution calculator 742 may perform posterior updates continuously (e.g., after every page impression, etc.).

After a posterior update is completed by the distribution calculator 742, the ads management module 740 may draw samples from the posterior distributions for each advertisement. For instance, the ads management module 740 may draw the sample $P_A$ from the posterior $P_A(\theta_A|X)$, and the sample $P_B$ from the posterior $P_B(\theta_B|X)$, where X represents the data used to perform the posterior updates. The ads management module 740 may then choose the advertisement with the largest posterior sample for display to a user. The ads management module 740 can repeat this process to select an advertisement for each page to serve until the next posterior update is performed by the distribution calculator 742.

Figure 3:
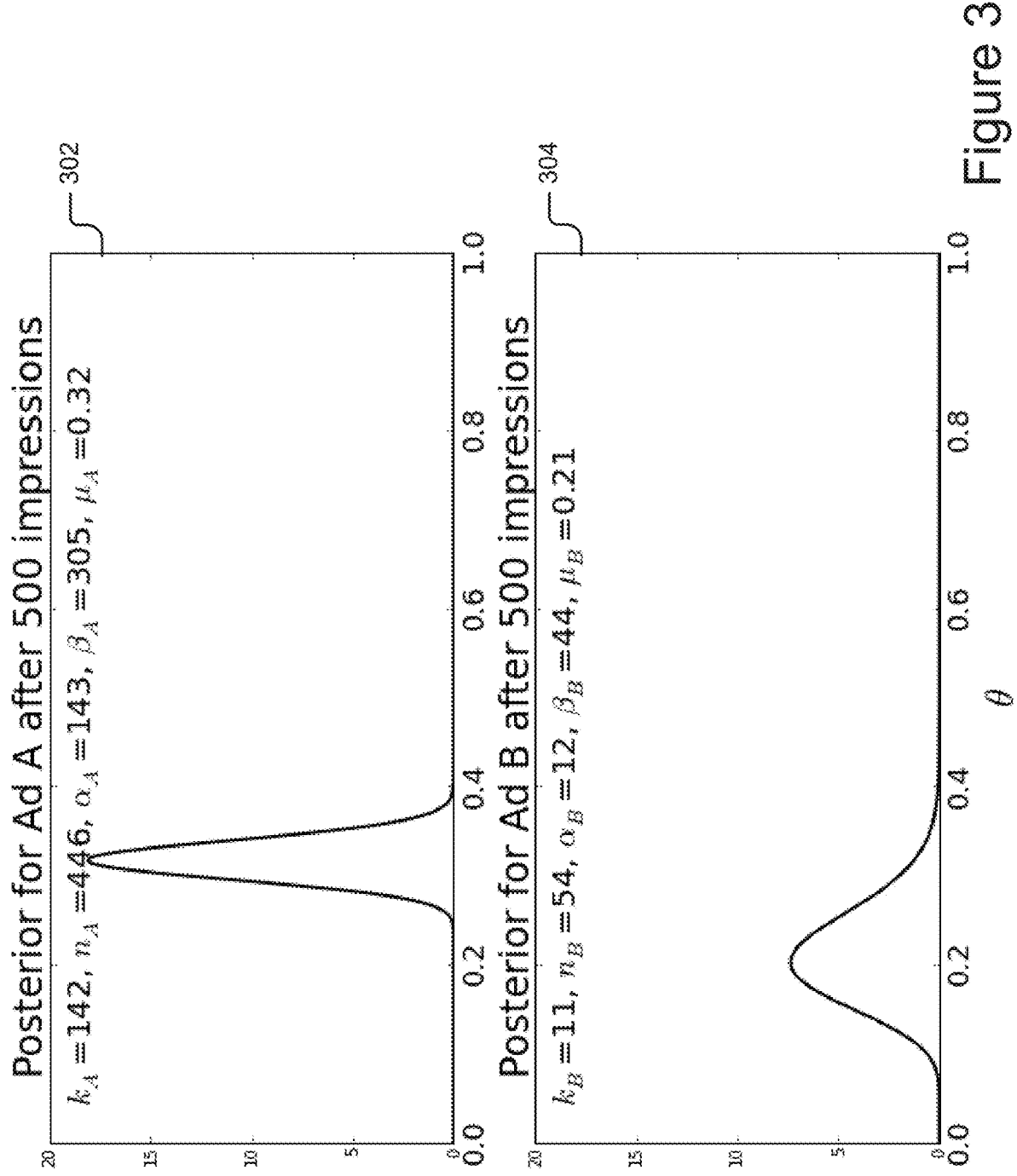
FIG. 3 illustrates example posterior distributions for advertisements A and B after 500 page views have been served.

FIG. 3 depicts plots 302 and 304 of example posterior distributions calculated by the distribution calculator 742 for advertisements A and B, respectively, after 500 page views have been served. As depicted, out of 500 page views, the ads management module 740 served 446 impressions for advertisement A and 54 impressions for advertisement B. The plots 302 and 304 show that the posterior distributions are getting narrower, which indicates that the click-through rates are known with greater precision. In addition, the difference in the click-through rates between advertisement A and advertisement B is becoming more apparent, with advertisement A having a higher click-through rate. Since advertisement A has a higher click-through rate, it has received a majority, namely 446 out of a total of 500 impressions.

Figure 4:
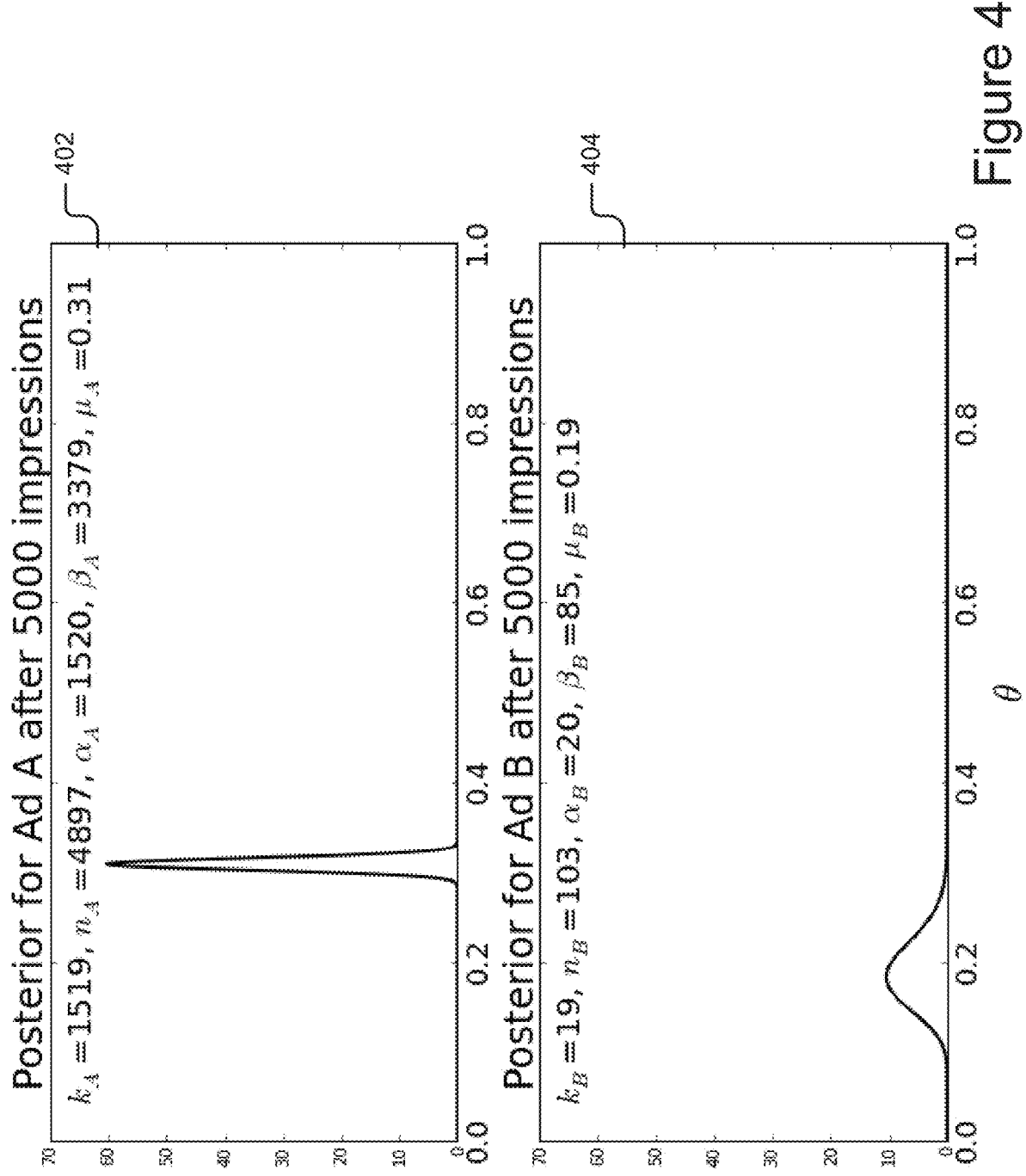
FIG. 4 illustrates example posterior distributions for advertisements A and B after 5000 page views have been served.

FIG. 4 depicts plots 402 and 404 of example posterior distributions calculated by the distribution calculator 742 after 5,000 total impressions have been served. From this figure, it is apparent that while both posterior distributions have narrowed, the distribution for advertisement A has narrowed more than the distribution for advertisement B. This is because of the greater number of impressions for advertisement A compared to advertisement B.

Improved Bayesian Bandit Algorithms for Collapse Avoidance, Diversity Maintainance, and Revenue and/or Profit Optimization In FIG. 4, as the number of impressions increases further, the posterior distribution collapses to a narrow spike. This situation poses a few problems. As can be seen in EQU. 4 above, computation of the Beta function involves the evaluation of Gamma functions. When the argument of the Gamma function becomes large, numerical problems can arise. Furthermore, the distribution with the most views may become very narrow and samples from it may predominate over samples from competing distributions, which can result in a situation where one advertisement is being displayed to the exclusion of the others. The designer may wish to maintain some diversity in the advertisements being presented to the user. The improved processing techniques described herein advantageously overcome the difficulties associated with unbounded growth of the parameters of the Beta distribution and the accompanying problems such as numerical instability and lack of diversity, as discussed in detail below.

In some embodiments, the distribution collapse avoidance module 746 may execute the following update formulas to overcome the difficulties discussed above with respect to FIGS. 1-4:

$$\mu = \frac{\alpha_0 + k}{\alpha_0 + \beta_0 + n} \quad \text{EQU. 13a}$$

$$\tilde{n} = \alpha_0 + \beta_0 + n_{max}\tanh(n/n_{max}) \quad \text{EQU. 13b}$$

$$\alpha = \mu\tilde{n} \quad \text{EQU. 13c}$$

$$\beta = (1-\mu)\tilde{n} \quad \text{EQU. 13d}$$

where tan h is the hyperbolic tangent function, $\alpha_0$, $\beta_0$ are the shape parameters of the prior Beta distribution, n is the number of page views, and k is the number of successes, e.g. clicks or purchases (the latter are often called conversions).

In other embodiments, the term $n_{max} \tan h(n/n_{max})$ in EQU. 13b may be replaced by other functions that display a saturating behavior for large values of their argument. For example, the following alternatives are possible replacements for EQU. 13b:

$$\tilde{n} = \alpha_0 + \beta_0 + \min(\max(0,n), n_{max}) \quad \text{EQU. 13b\_alternative\_1}$$

$$\tilde{n} = \alpha_0 + \beta_0 + n_{max} erf(n/n_{max}) \quad \text{EQU. 13b\_alternative\_2}$$

where in alternative 2, erf is the error function.

EQUs. 13a-13d can advantageously prevent the posterior distributions from collapsing as the total number of impressions increases over time. More particularly, for example, these formulas can prevent the distribution from becoming narrower than a Beta distribution associated with an advertisement that receives $n_{max}$ impressions. The formulas of EQUs. 13a-13d may be applied continuously and may act without any abrupt transitions in behavior.

Figure 5:
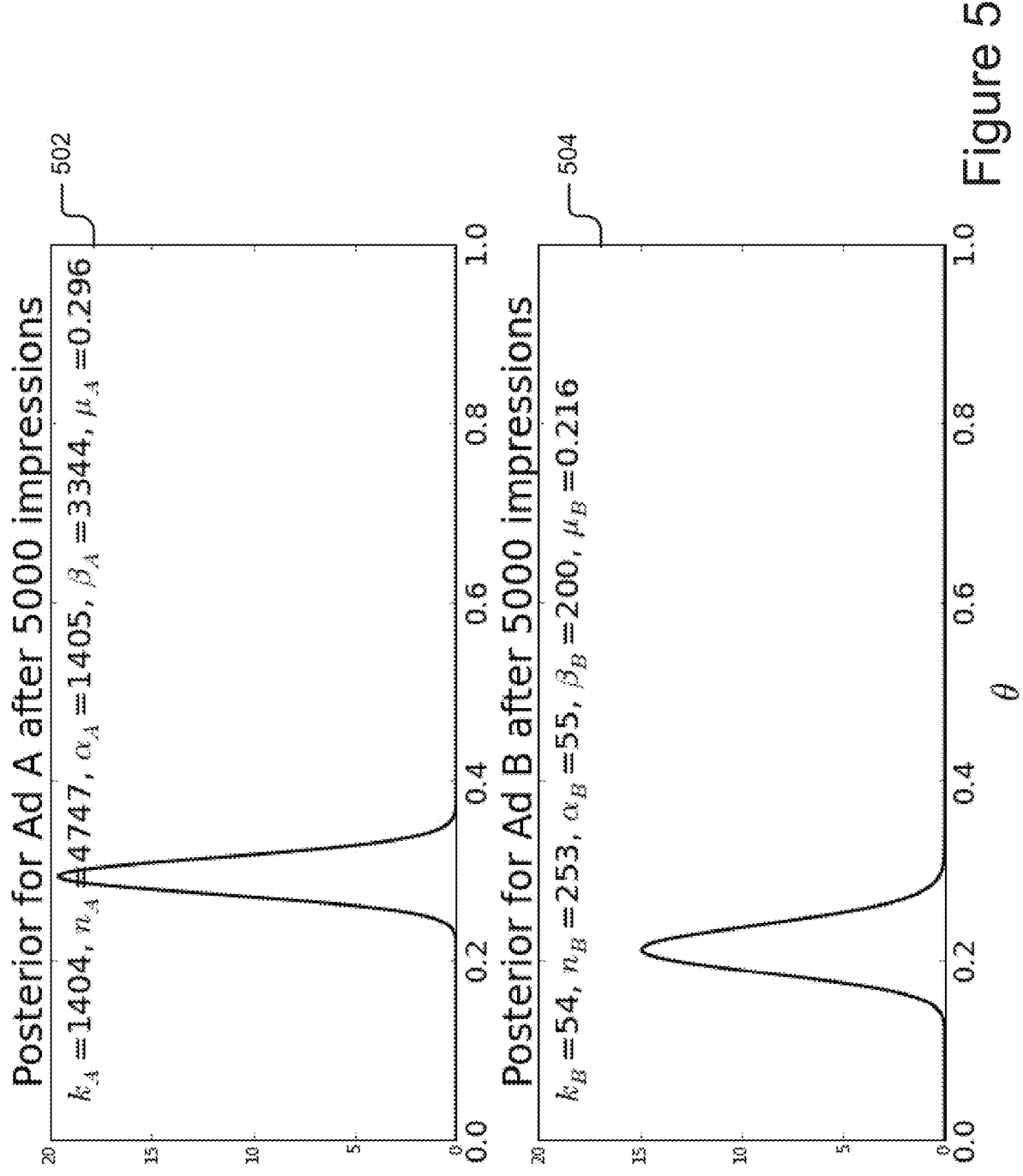
FIG. 5 illustrates alternative example posterior distributions for advertisements A and B after 5000 page views have been served.

FIG. 5 depicts plots 502 and 504 of example posterior distributions of the click-through rates calculated by the distribution collapse avoidance module 746 for advertisements A and B, respectively, using the update formulas in EQUs. 13a-13d. It can be seen that the distributions for the two advertisements do not display the narrowness that can be observed with respect to FIG. 4, which is associated with the update formulas in EQU. 9.

In some embodiments, the click-through rates for advertisements may change over time, for example, they may have seasonal variation. While the system of Bayesian Bandit updates in EQUs. 13a-13d solves the problem of collapsing distributions, these equations can in some cases saturate when the number of impressions exceed $n_{max}$. Thus, the pattern of ad recommendations may tend to become static after certain duration. This means that the system may become unresponsive to changing advertisement preferences in the customer base.

The technology disclosed herein advantageously overcomes the issues associated with static advertisement recommendation patterns. In an embodiment, the ads diversity module 750 of the personalization server 730 (see FIG. 7B) may address these issues by summing the contributions to the updates in EQU. 9 or EQU. 13 over a moving time window.

By way of further example, the time at which the Bayesian Bandit update is made can be denoted as the "present time", and can be defined as t=0. The number of ad impressions at time t before the present time is denoted n(t) and the number of successes at time t before the present is denoted k(t). The ads diversity module 750 may utilize a Bayesian bandit algorithm to update equations that dynamically responds to changing advertisement preferences by incorporating the following set of equations:

$$\hat{k} = \sum_{t=-T}^{t=0} w(t)k(t) \quad \text{EQU. 14a}$$

$$\hat{n} = \sum_{t=-T}^{t=0} w(t)n(t) \quad \text{EQU. 14b}$$

$$\mu = \frac{\alpha_0 + \hat{k}}{\alpha_0 + \beta_0 + \hat{n}} \quad \text{EQU. 14c}$$

$$\tilde{n} = \alpha_0 + \beta_0 + n_{max}\tanh(\hat{n}/n_{max}) \quad \text{EQU. 14d}$$

$$\alpha = \mu\tilde{n} \quad \text{EQU. 14e}$$

$$\beta = (1-\mu)\tilde{n} \quad \text{EQU. 14f}$$

Here, T is the duration of the time window during which events may contribute to the Bayesian Bandit update, and w is a weighting kernel. In some embodiments, the window duration is 2 weeks. In some other embodiments, the ads diversity module 750 may use a different window duration that may depend on the rate of change of advertisement preferences or may depend on the season.

Figure 6:
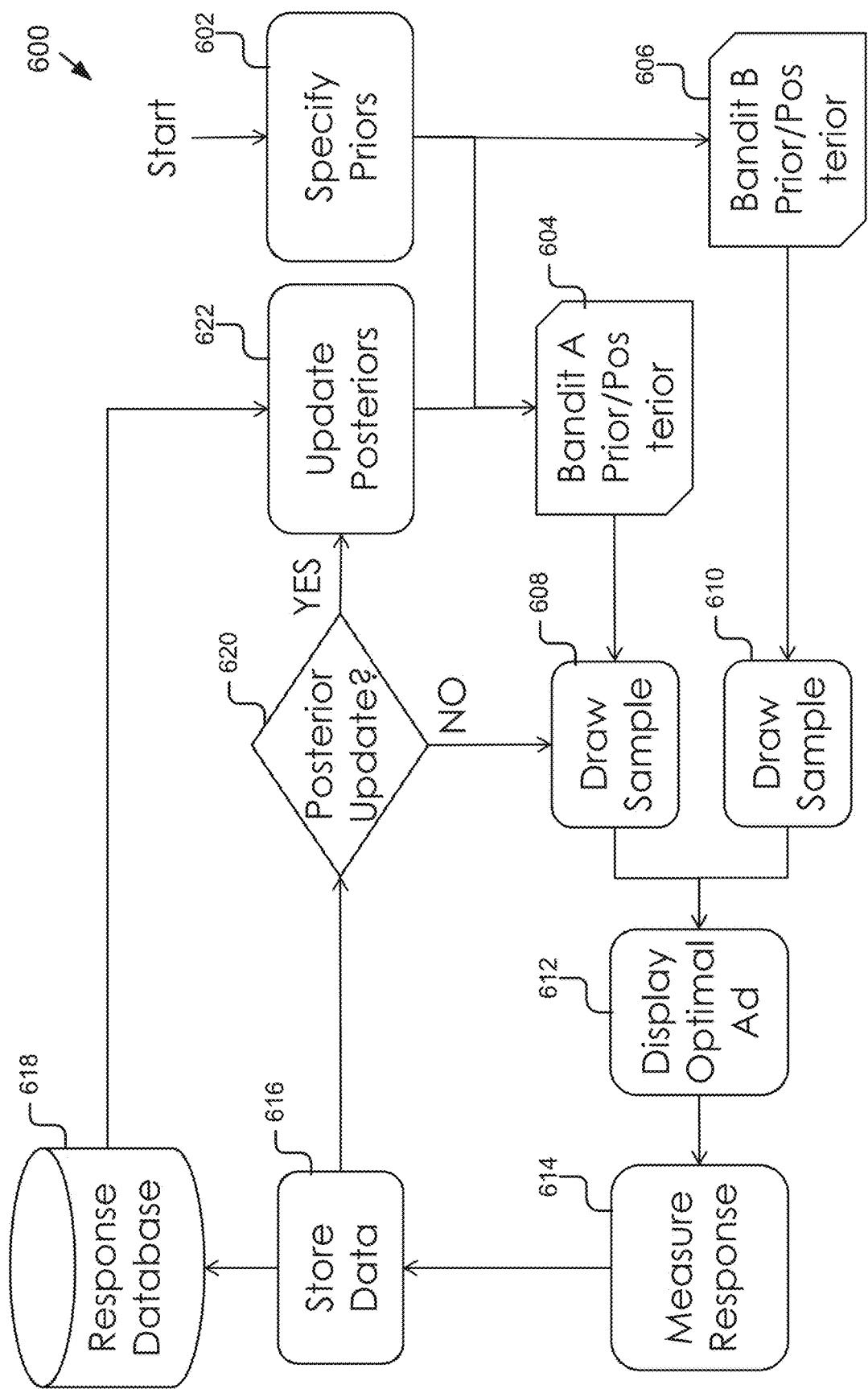
FIG. 6 is a process flow diagram illustrating an example method for advertisements selection.

FIG. 6 is a process flow diagram 600 for advertisements selection. The process starts at block 602 with the distribution calculator 742 selecting parameters for prior Beta distribution calculation and then calculating Bandit A prior distribution 604 and Bandit B prior distribution 606 based on the selected parameters. The ads management module 740 may draw samples 608 and 610 from priors 604 and 606, respectively. In block 612, the ads management module 740 may compare the samples, for example using either via EQU. 15, EQU. 16, EQU. 18, or EQU. 19, and then selecting the winning advertisement for display to a user. The click-through rate from the user is measured in block 614 and then stored 616 in the response database 618.

Flow proceeds to block 620 where the distribution calculator 742, the distribution collapse avoidance module 746, and/or the ads diversity module 750 may decide whether a posterior update should be performed. This can be based on time elapsed since last update or number of impressions since last update. If it is not time for an update, flow resumes in blocks 608 and 610 where the ads management module 740 draws samples from the current posteriors, 604 and 606, and the cycle is repeated as discussed above. If it is time for an update, the distribution calculator 742, the distribution collapse avoidance module 746, and/or the ads diversity module 750 may access data from the response database 618 to update 622 the posteriors according to the update rules given by EQU. 9, EQU. 13, or EQU. 14, as discussed elsewhere herein.

In some embodiments, the developer of a website or mobile application may be interested in maximizing the expected total click-through rate of an advertisement that is placed on a page. Suppose that the page can display any one of 10 advertisements numbered i=1, . . . , 10. The Bayesian Bandit formulas in EQU. 9, EQU. 13, or EQU. 14 can be used to update the posterior distributions for each of the advertisements. Samples $p_i$, for i=1, . . . , 10 are generated from each of the posterior distributions. The index of the advertisement to be displayed may be given by:

$$\text{Index of recommended advertisement} = \arg\max_i \; p_i \quad \text{EQU. 15}$$

where $p_i$ is a sample from the modeled posterior click-through probability distribution for advertisement i. The recommendation in EQU. 15 will maximize the expected click-through rate.

In some further embodiments, the objective for the selecting advertisements may be to maximize revenue or profit. The following example involving the maximization of revenue is provided by way of illustration, however, this example should not be construed as limiting. A developer of the website or mobile application may be interested in maximizing revenue from the advertisements placed on the page. Suppose that advertisers pay different amounts to have their advertisement displayed on a website and that each advertisement generates an amount of revenue represented by the fixed numbers $r_i$, for i=1, . . . , 10. The revenue estimator 748 of the personalization server 730 (see FIG. 7B) may maximize a certain expected revenue (e.g., total expected revenue) by displaying an advertisement whose index is given by:

$$\text{Index of recommended advertisement} = \arg\max_i \; r_i p_i \quad \text{EQU. 16}$$

where $p_i$ is a sample from a modeled posterior click-through probability distribution and $r_i$ is the revenue associated with advertisement i. Other objectives, e.g. profit, margin, social media value, etc., may be maximized by replacing the $r_i$ in EQU. 16 with the relevant quantity of interest.

Turning now to eCommerce in particular, the following non-limiting example is provided. A developer of an eCommerce application (e.g., website, mobile application, etc.) may place advertisements for a number of offers on a page of the application. The developer may be interested in placing the advertisement that will result in the most revenue. Suppose that there are advertisements for 10 offers numbered i=1, . . . , 10 that may be placed on the page. There may be a fixed amount of revenue associated with each offer represented by the fixed numbers $r_i$, for i=1, . . . , 10. Maximizing the click-through rate does not necessarily maximize the revenue. Neither is the revenue maximized simply by maximizing the product of revenue and click-through rate. This may be because a visitor who visits the application and clicks on an advertisement does not necessarily purchase the product represented by the advertisement.

In regard to the purchase of a product, the revenue estimator 748 module may associate a probability with this operation. This probability may be referred to interchangeably as the conversion rate (CR), purchase probability, or buy probability.

More particularly, for example, the revenue estimator 748 may compute an average revenue generated from advertisement i with the following formula:

$$\text{Average revenue from advertisement } i = r_i P_{click}(\theta_{click}) P_{buy}(\theta_{buy}) \quad \text{EQU. 17}$$

where $r_i$ is the revenue associated with ad i, $P_{click}(\theta_{click})$ is the click-through probability distribution with its probability parameter $\theta_{click}$, and $P_{buy}(\theta_{buy})$ is the conversion-rate probability distribution with its probability parameter $\theta_{buy}$. EQU. 17 describes that average revenue is the product of the revenue times the click-through rate times the conversion rate.

The click-through probability distribution may be based on a Bernoulli trial with a probability parameter modeled using Bayesian Bandit algorithms.

Additionally or alternatively, the conversion (purchase) may be similarly considered as a Bernoulli trial and modeled with its own, independent probability parameter (conversion rate). In some embodiments, the conversion-rate parameter can be modeled alongside the click-through rate parameter in a parallel fashion. The number of views and click-throughs for each advertisement are maintained in one set of variables, while the number of conversions (purchases) are maintained in a different set of variables for each advertisement. The revenue estimator 748 may apply update formulas like those mentioned above with respect to EQU. 9, EQU. 13, or EQU. 14 conversions as with click-throughs. More particularly, click-through probability samples $p_i^{click}$ may be drawn from the posterior click-through probability distributions for each advertisement i. Conversion probability samples $p_i^{buy}$ are drawn from the posterior conversion probability distributions for each advertisement i. In some embodiments, the revenue estimator 748 may maximize a certain expected revenue (e.g., total expected revenue) by displaying an advertisement whose index is given by:

$$\text{Index of recommended advertisement} = \arg\max_i \; r_i p_i^{click} p_i^{buy} \quad \text{EQU. 18}$$

where is $p_i^{click}$ a sample from the modeled posterior click-through probability distribution, $p_i^{buy}$ is a sample from the modeled posterior conversion probability distribution, and $r_i$ is the revenue associated with advertisement i.

In some embodiments, the revenue estimator 748 in performing its calculations (e.g., using EQU. 17 and 18) may use conversion data that meticulously keeps track of visitor views, clicks and purchases as they navigate the revenue funnel, from seeing an advertisement, to clicking the advertisement, and finally to making the purchase. In some cases, visitors may enter the application (e.g., land on the website) as a result of clicking an advertisement in an email campaign or from a general web search or from an advertisement that is placed on a multitude of other websites.

In some embodiments, the conversion rate may be modeled using historical data from an eCommerce website. Data from purchases made on the website accumulated over a period of time may be used to build a conversion rate model, using techniques such as machine learning. The model may take into account numerous factors, such as one or more of the location of the consumer, the time of day, the day of the week, the day of the month, and the month of the year as well as product attributes such as the price, the type of product, and the color. The list of attributes and factors that may be incorporated into a model is virtually endless and the list of attributes and factors given here is not intended to be exhaustive nor is it intended to be limiting in any sense.

The revenue estimator 748 may maximize a certain objective (e.g., the total expected revenue) by displaying an advertisement whose index is given by:

$$\text{Index of recommended advertisement} = \arg\max_i r_i p_i^{click} P_i^{buy} \quad \text{EQU. 19}$$

where $p_i^{click}$ is a sample from the modeled posterior click-through probability distribution given by the Bayesian Bandit, $P_i^{buy}$ is an output of the conversion probability model that is trained from historical data, and $r_i$ is, in this case, the revenue associated with advertisement i, although it should be understood that other variations are also possible as discussed elsewhere herein.

In some applications, a developer may want to display more than one advertisement on a page. As a concrete but non-limiting example, the developer may want to display 4 different advertisements to a user in the same page view. Additionally, the developer may like the advertisements displayed on the page to be diverse. The ads management module 740 may be further configured to select four diverse advertisements based on diversity data computed by the ads diversity module 750. More particularly, for example, the ads diversity module 750 may use feature selection machine learning techniques to identify a diverse set of advertisements for selection.

In some embodiments, the applied machine learning techniques may include a Minimum Redundancy Maximum Relevance (mRMR) algorithm. This is advantageous in helping to ensure that the ads selected by the ads management module 740 are sufficiently diverse. The following is a description of the mRMR algorithm in the context of feature selection.

The ads diversity module 750 can measure the relevance of a feature $x_i$ by the mutual information between the feature and a target variable y. The mutual information between feature $x_i$ and the target variable y may be denoted by $I(x_i, y)$. The other quantity of interest in the mRMR problem is the similarity between pairs of features $x_i$ and $x_j$. This quantity may be computed via the mutual information between pairs of features $x_i$ and $x_j$ which is denoted $I(x_i, x_j)$. The aim of the mRMR algorithm is to find the set of features $x_i$ that maximize the total Relevance while minimizing the total Redundancy. F represents the set of indices of features that are included in a machine learning model:

$$\text{Optimal set of features} = \arg\max_{\mathcal{F}} \sum_{i \in \mathcal{F}} I(x_i, y) - \frac{1}{|\mathcal{F}|} \sum_{i \neq j \in \mathcal{F}} I(x_i, x_j) \quad \text{EQU. 20}$$

Applying this concept to the problem of choosing advertisements that are diverse, the ads diversity module 750 may measure relevance of an advertisement by its Thompson sample. As context, Thompson sampling chooses an action that maximizes a reward based on a randomly drawn sample from a posterior distribution of parameters that govern the likelihood function of the reward.

By way of example, in an embodiment governed by EQU. 15, the Thompson sample is $p_i$, or $r_i p_i$ for the embodiment governed by EQU. 16, or $r_i p_i^{click} p_i^{buy}$ embodiment governed by EQU. 18, or $r_i p_i^{click} P_i^{buy}$ for the embodiment governed by EQU. 19.

By way of another example, in an embodiment where redundancy is measured, the Thompson sample can be generically represented by the symbol $t_i$. The ads diversity module 750 may measure redundancy based on a similarity between ads i and j. This may be denoted as $S_{ij}$. The values $S_{ij}$ may be computed in advance or supplied by the developer. The ads diversity module 750 may then rank a set of advertisements by the mRMR criterion to determine a set A of diverse advisements to be included on a page using the following formula:

$$\text{set of diverse advertisements} = \arg\max_A \sum - \frac{1}{|A|} \sum s_{ij} \quad \text{EQU. 21}$$

Example System

Figure 7A:
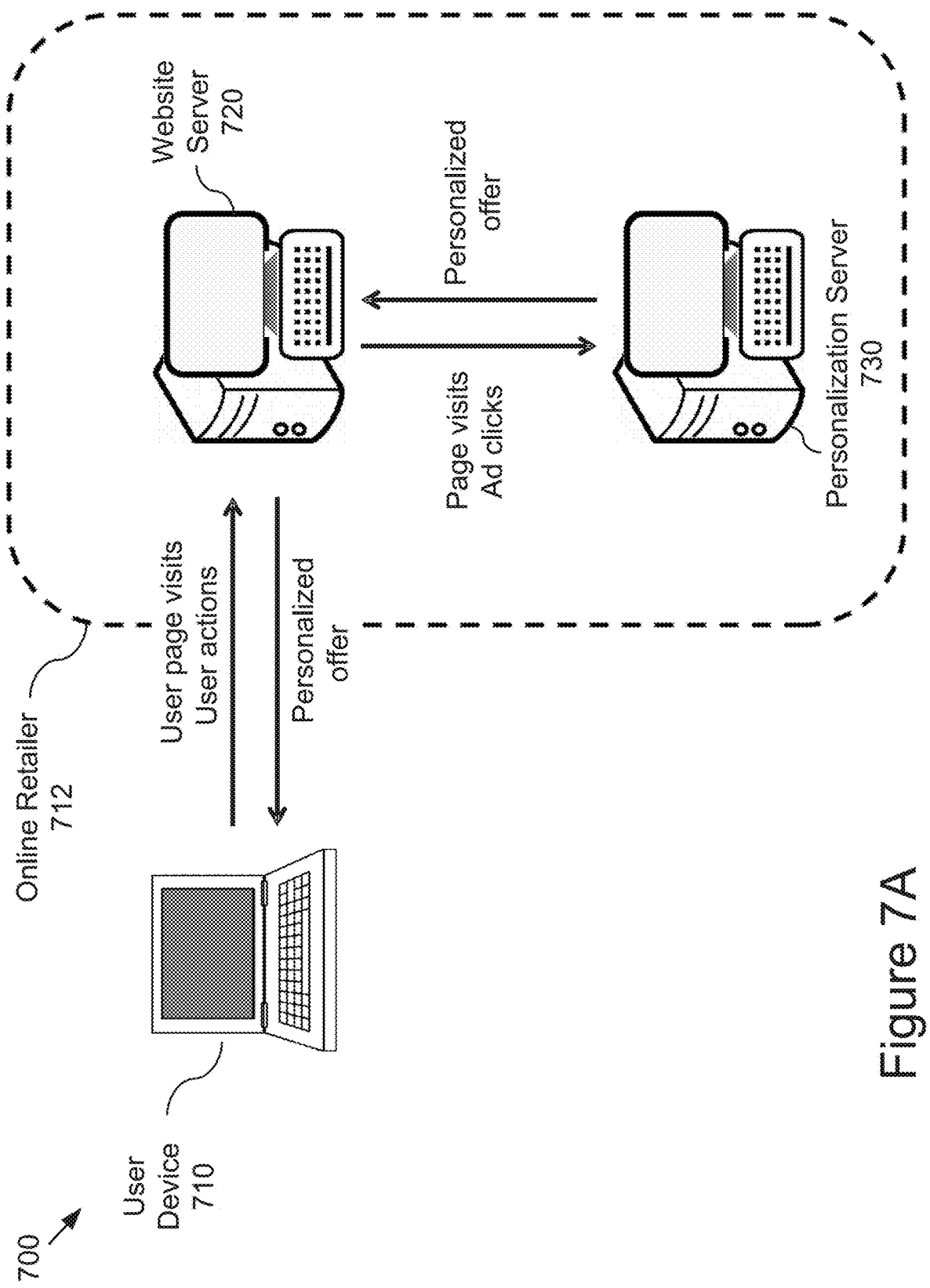
FIGS. 7A and 7B are block diagrams illustrating an example system for selecting one or more promotions for display using Bayesian bandits.
Figure 7B:
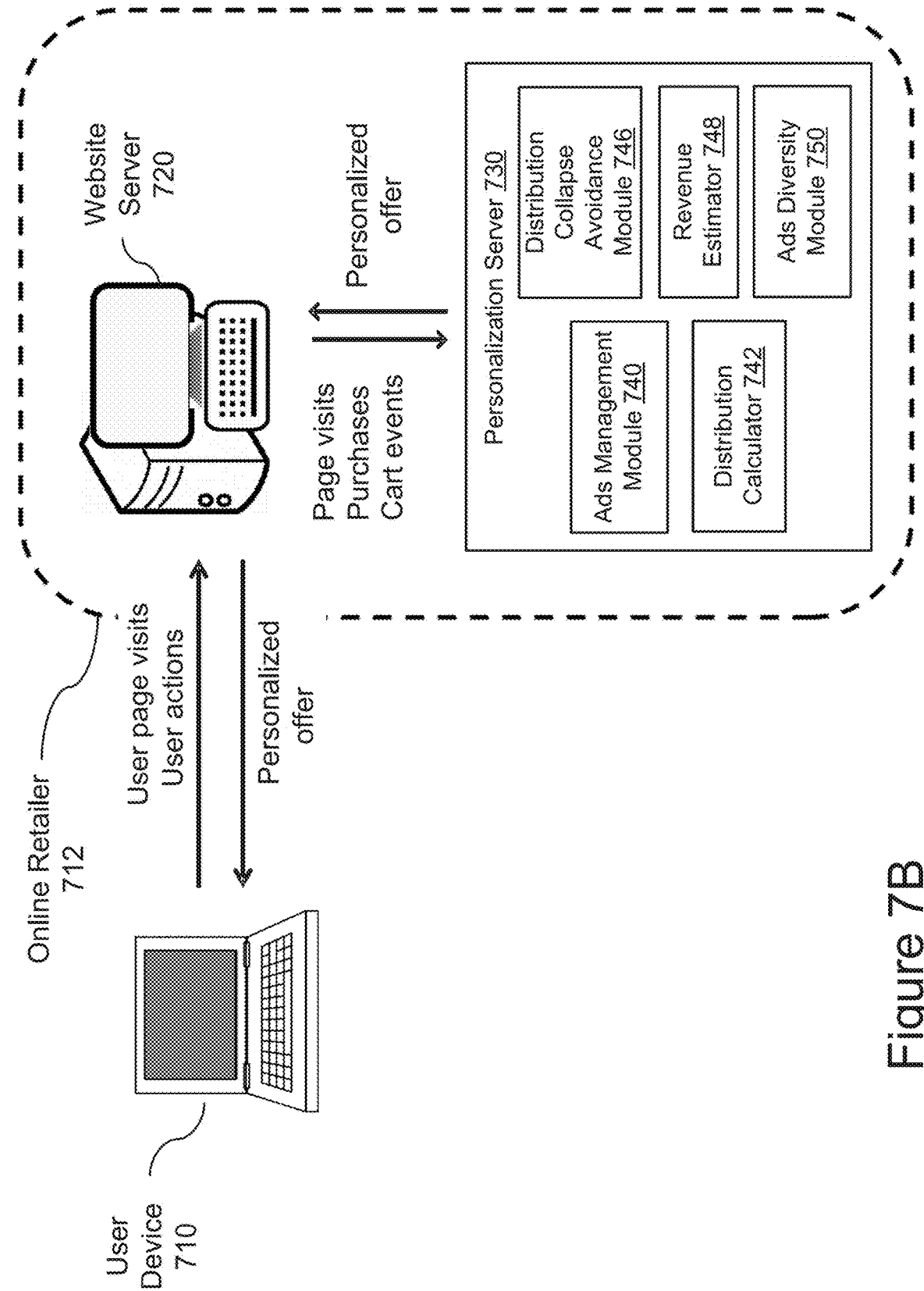

FIG. 7A is a block diagram of an example computing environment/system 700. An online retailer 712 may use the techniques taught in the present description to compute offers and present them to a user during his or her online session. A user device 710 may connected to the online retailer's 712 website server 720 via a network. The network may include any number of networks and/or network types. For example, the network may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user device 710 includes one or more computing devices having data processing and communication capabilities. In some embodiments, a user device 710 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The user device 710 may couple to and communicate with the other entities of the environment 700 via the network using a wireless and/or wired connection. While a single user device 710 and website server 720 are depicted, it should be understood that the system 700 could include any number of these computing devices, as well as other computing devices such as third-party servers including data processing, storing and communication capabilities configured to provide one or more services including e-commerce; web analytics, internet searching; social networking; web-based email; blogging; micro-blogging; photo management; video, music and multimedia hosting, distribution, and sharing; business services; news and media distribution; or any combination of the foregoing services. It should be understood that the third party server is not limited to providing the above-noted services and may include any other network-based or cloud-based service.

The user device 710 may include but is not limited to a computer, tablet, mobile device, etc. While a single user device 710 is depicted in FIG. 7A, the environment 700 may include any number of user devices 710. In addition, the user device(s) 710 may be the same or different types of computing devices.

In some embodiments, the user device 710 may include a user/client application (not shown). The user application may be storable in a memory (not shown) and executable by a processor (not shown) of a user device 710 to provide for user interaction, receive user input, present information to the user via a display (not shown), and send data to and receive data from the other entities of a computing system 700 via a computer network (e.g., the Internet, etc.). In some embodiments, the user application may generate and present the user interfaces based at least in part on information received from the website server 720 via the network. For example, a customer/user may use the user application to receive the personalized shopping experience provided by the personalization server 730 and/or an e-commerce service provided by the website server 720, etc. In some embodiments, the user application includes a web browser and/or code operable therein, a customized client-side application (e.g., a dedicated mobile app), a combination of both, etc.

The website server 720 may include one or more computing devices having data processing, storing, and communication capabilities. For example, the website server 720 may include one or more hardware servers, server arrays, storage devices and/or systems, etc. In some embodiments, the website server 720 may include one or more virtual servers, which operate in a host server environment and access the physical hardware of the host server including, for example, a processor, memory, storage, network interfaces, etc., via an abstraction layer (e.g., a virtual machine manager). In some embodiments, the website server 720 may include a web server (not shown), a REST (representational state transfer) service, or other server type, having structure and/or functionality for satisfying content requests and receiving content from one or more computing devices that are coupled to the network (e.g., the user device 710, etc.).

The user's page visits and actions, using the user device 710, on the website are communicated to the website server 720. These page visits and user actions are in turn communicated to a personalization server 730. The personalization server 730 maintains a database of user responses to the offers that are displayed. Using the techniques taught by the present subject matter, the personalization server 730 computes offers or advertisements to be shown to the user. The personalization server 730 instructs the website server 720 to provide the recommended offers or advertisements to the user device 170 of the user.

FIG. 7B illustrates in greater detail an example embodiment of the personalization server 730 described in reference to FIG. 7A. Although FIG. 7B is generally directed to describing the personalization server 730, it should be understood that the website server 720 may include many of the same types of components (e.g., processor(s), memory (ies), communication unit(s), data store(s), etc.) as the personalization server 730, and that, in some embodiments, it may share components with the personalization server 730. For instance, in some embodiments, some or all of the structure and/or functionality of the personalization server 730 described herein could be included in/performed on the website server 720 and/or the structure and/or functionality could be shared between the website server 720 and the personalization server 730.

It should be understood that the system 700 illustrated in FIGS. 7A and 7B is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some embodiments may include additional or fewer computing devices, services, and/or networks, and may implement various functionality client or server-side. Further, various entities of the system 700 may be integrated into a single computing device or system or additional computing devices or systems, etc.

The personalization server 730 may include one or more hardware servers, server arrays, storage devices, and/or systems, etc. In some embodiments, the personalization server 730 may include one or more virtual servers which operate in a host server environment and access the physical hardware of the host server including, for example, a processor, a memory, a storage, network interfaces, etc.

The personalization server 730 may include one or more processors, memories, communication units, and data stores. Each of the components of the personalization server 730 may be communicatively coupled by a communication bus. The personalization server 730 is provided by way of example and it should be understood that it may take other forms and include additional or fewer components without departing from the scope of the present disclosure. For example, while not shown, the personalization server 730 may include input and output devices (e.g., keyboard, display, etc.), various operating systems, sensors, additional processors, and other physical configurations.

The processor(s) (not shown) may execute various hardware and/or software logic, such as software instructions, by performing various input/output, logical, and/or mathematical operations. The processor(s) may have various computing architectures to process data signals including, for example, a complex instruction set computer (CISC) architecture, a reduced instruction set computer (RISC) architecture, and/or an architecture implementing a combination of instruction sets. The processor(s) may be physical and/or virtual, and may include a single core or plurality of processing units and/or cores. In some embodiments, the processor(s) may be capable of generating and providing electronic display signals to a display device (not shown), supporting the display of images, capturing and transmitting images, performing complex tasks including various types of feature extraction and sampling, etc. In some embodiments, the processor(s) may be coupled to the memory(ies)

via a data/communication bus to access data and instructions therefrom and store data therein. The bus may couple the processor(s) to the other components of the personalization server 730, for example, memory(ies), communication unit(s), or a data store.

The memory(ies) (not shown) may store and provide access to data to the other components of the personalization server 730. For example, the memory(ies) may store the ads management module 740, the distribution calculator 742, the distribution collapse avoidance module 746, the revenue estimator 748, and the ads diversity module 750. The memory(ies) is also capable of storing instructions and data, including, for example, an operating system, hardware drivers, software applications, databases, etc. The memory(ies) may be coupled to a data bus for communication with the processor(s) and other components of the personalization server 730.

The memory(ies) include one or more non-transitory computer-usable (e.g., readable, writeable, etc.) media, which can be any tangible non-transitory apparatus or device that can contain, store, communicate, propagate or transport instructions, data, computer programs, software, code, routines, etc., for processing by or in connection with the processor(s). In some embodiments, the memory(ies) may include one or more of volatile memory and non-volatile memory. For example, the memory(ies) may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blu-ray™, etc.). It should be understood that the memory(ies) may be a single device or may include multiple types of devices and configurations.

The bus can include a communication bus for transferring data between components of a computing device or between computing devices, a network bus system including a network or portions thereof, a processor mesh, a combination thereof, etc. For example, the bus may enable communication between components of the online retailer 712 and/or other computing devices of the system 700, such as the user device 710. A software communication mechanism can include and/or facilitate, for example, inter-process communication, local function or procedure calls, remote procedure calls, etc. The personalization server 730 and its components may be communicatively coupled, for example, via a data bus (not shown) to each other, the online retailer 712, and/or the user device 710.

A communication unit may include one or more interface devices (I/F) for wired and/or wireless connectivity with a network and the other components of the personalization server 730. For instance, a communication unit may include, but is not limited to, category (CAT)-type interfaces (e.g., wired connections, cable, Ethernet, etc.); wireless transceivers for sending and receiving signals using Wi-Fi™; Bluetooth®, cellular communications, etc.; USB interfaces; various combinations thereof; etc. A communication unit may be coupled to at least the other components of the personalization server 730 via a bus as described above.

The data store or data storage device may store information usable by the other components of the online retailer 712 including the personalization server 730 and may make the information available to the other components, for example, via a bus. In some embodiments, the data store may store historical data, user data (e.g., preferences, biographical information, etc.), application data, session data (current, previous, etc.), clickstream data (e.g., counts of impressions, click-throughs and/or conversions associated with an advertisement), reward (e.g., total revenue, profit, etc.) expected to be generated from an advertisement, reward produced from the presentation of the advertisement, and/or other information usable by the personalization server 730.

The data store may include one or more mass storage devices. Information stored by a data store may be organized and queried using various criteria. Examples of query criteria may include any type of data stored by the data stores, such as a user profile attribute, keyword(s), date(s), advertisement identifier, e-mail address, IP address, demographics data, user id, rewards account number, product identifier, price identifier, or any other suitable information.

A data store may include data tables, databases, or other organized collections of data. Multiple data stores may all be included in the same storage device or system, or disparate storage systems. In some embodiments, a data store may include a database management system (DBMS). For example, the DBMS could include a structured query language (SQL) DBMS, a not only SQL (NoSQL) DMBS, various combinations thereof, etc. In some instances, the DBMS may store data in multi-dimensional tables comprised of rows and columns, and manipulate, i.e., insert, query, update and/or delete, rows of data using programmatic operations. In some embodiments, a data store may be shared among and accessible to the components of the online retailer 712.

As depicted and discussed elsewhere herein, the personalization server 730 may include an ads management module 740, a distribution calculator 742, a distribution collapse avoidance module 746, a revenue estimator 748, and an ads diversity module 750. The acts and/or functionalities provided by the distribution calculator 742, the distribution collapse avoidance module 746, the revenue estimator 748, and the ads diversity module 750 are sometimes referred to herein as click-through testing or buy testing.

The ads management module 740 includes computer logic executable by a computer processor of the personalization server 730 and/or another processor to select one or more particular advertisements based on one or more bias reduction and/or diversification models. In some implementations, the ads management module 740 may determine a set of advertisements for click-through testing or buy testing, provide an advertisement with the highest or nearly highest (e.g., within 5%, etc.) click-through rate or buy rate for display to users, and receive, update, and/or store advertisements in a data store, store, retrieve, and/or update advertisement-related data determined by the system 700, such as counts of impressions, click-throughs and/or conversions associated with the advertisements in the data store. In some embodiments, the ads management module 740 may perform its acts and/or functionalities described herein in cooperation with other components of the system 700, such as the distribution calculator 742, the distribution collapse avoidance module 746, and/or the ads diversity module 750.

The distribution calculator 742 includes computer logic executable by a computer processor of the personalization server 730 and/or another processor to calculate a prior and/or a posterior distribution associated with an advertisement and generating a probability using the prior distribution and/or the posterior distribution. By way of example and not limitation, a prior or a posterior distribution associated with an advertisement may include a distribution of click-through or buy probability associated with the advertisement. In some embodiments, the distribution calculator 742 may perform its calculation based on some prior knowledge associated with each of the advertisements and/or a rough estimation.

In some embodiments, the distribution calculator 742 may calculate prior distribution(s) in response to receiving a signal from the ads management module 740. The signal may include data describing an advertisement for evaluation (e.g., click-through testing, buy testing, etc.). Once the prior distribution is calculated, the distribution calculator 742 may calculate a buy or purchase probability associated with the advertisement.

In some embodiments, the distribution calculator 742 may calculate posterior distribution(s) in response to receiving evidence in the form of clickstream data from data storage and/or another information source (e.g., user device, another server, etc.). Probabilities reflected by the posterior distribution(s) are generally more reliable than the prior distribution(s) since they are based at least in part on actual evidence data, such as but not limited to, prior distribution(s) calculated by the distribution calculator 742 for the advertisement, as discussed above.

The distribution calculator 742 may store the distributions and/or probabilities generated by it in a data store for access or retrieval by it and/or other components of the system 700 and/or send the data generated by it to other components of the system 700, such as the ads management module 740. The ads management module 740 may use the probability(ies) generated by the distribution calculator 742 for ad comparison and/or selection. For instance, as discussed elsewhere herein, the ads management module 740 may use the probabilities associated with a set of advertisements to select the advertisement with a certain probability (e.g., the highest probability, probability within a certain upper range, etc.) for purchase, click-through, etc. In some cases, the advertisement may be selected based on its sampled probability relative to the other advertisements of a given set.

The distribution collapse avoidance module 746 includes computer logic executable by a computer processor of the personalization server 730 to avoid distribution collapse when the posterior distributions are calculated, as discussed elsewhere herein. In some embodiments, the distribution collapse avoidance module 746 may perform distribution collapse avoidance responsive to receiving a signal indicating a previously or currently calculated posterior distribution has or is collapsing (e.g., from the distribution calculator 742), responsive to monitoring incoming data (e.g., clickstream data) for certain anomalies, etc. A non-limiting example of a distribution collapse, such narrow spiking, is depicted in FIG. 4. In some embodiments, the distribution collapse avoidance module 746 may cooperatively perform its operations with the distribution calculator 742. In other embodiments, the distribution collapse avoidance module 746 is always in operation, and cooperatively performs its operations with the distribution calculator 742. In further embodiments, the distribution collapse avoidance module 746 may perform its operations independent of any previously calculated prior distributions by the distribution calculator 742.

By way of further example, the distribution collapse avoidance module 746 may receive data (e.g., shape parameter values, number of page impressions served for each advertisement, number of successes, etc.) used during a currently or previously calculated posterior distributions from the distribution calculator 742, and provide feedback data reflecting distribution-narrowing limits to the distribution calculator 742 for the distributions calculated thereby. Alternatively, in some embodiments, the distribution collapse avoidance module 746 may calculate updated, non-collapsed, posterior distributions and corresponding probability calculations responsive to receiving a number of page views to serve for advertisements beyond a certain threshold.

In a further non-limiting example, if an advertisement is requested to be served in such a manner that the posterior distribution calculated by the distribution calculator 742 for this advertisement may collapse, the distribution collapse avoidance module 746 may calculate or limit the calculation of the posterior distribution as discussed elsewhere herein in order to avoid the collapsing. The distribution collapse avoidance module 746 may provide the data generated by it to the distribution calculator 742 and/or the ads management module 740 for use thereby, and/or may store and/or update corresponding data in a data store for access and/or retrieval.

The revenue estimator 748 includes computer logic executable by a computer processor of the personalization server 730 and/or another processor to estimate total revenue expected to generate upon displaying a particular advertisement in an application (e.g., on a website). In some embodiments, the revenue estimator 748 may retrieve an advertisement with a certain click-through rate (e.g., the highest click-through and/or buy rate) from a data store and then determine a user-action probability (e.g., purchase, buy, click-through, probability etc.) associated with the advertisement. For instance, user-action probabilities associated with the advertisements may be stored by the ads management module 740 in the response database 618, as discussed elsewhere herein, and the revenue estimator 748 may access the response database 618 to retrieve a corresponding advertisement along with its user-action probability (e.g., click-through probability, buy probability, etc.).

Once the advertisement is retrieved, the revenue estimator 748 may determine an estimated revenue associated with the advertisement. For instance, a certain amount of revenue may be associated with each advertisement and stored in a data store, and the revenue estimator 748 may access the data store to determine the revenue associated with a given advertisement. The revenue estimator 748 may then calculate the total expected revenue associated with the advertisement based on the product of the revenue, the user-action probability(ies) (e.g., click-through probability and/or the buy probability, etc.) associated with the advertisement, as discussed elsewhere herein. In some embodiments, responsive to calculating the total expected revenue, the revenue estimator 748 may send the total expected revenue associated with the advertisement to the ads management module 740, which may then store the calculated revenue in a data store (e.g., the response database 618) for later access and/or retrieval, or may provide it for display to a user (e.g., an administrator in a report). Additionally or alternatively, the calculated revenue may be used in future calculations performed by the system 700 to further enhance various results and/or probability calculations.

The term advertisement, as well as the term promotion, are used liberally and are not meant to be construed as a specific type of advertisement or promotion, and can include any type of digital promotional content, whether it be an advertisement, offer, pitch, or other promotional content type. Additionally, a product includes any type of product or service that can be purchased, licensed, contracted for, etc., by a user.

The ads diversity module 750 includes computer logic executable by a computer processor of the personalization server 730 and/or another processor to diversify advertisements for display in an application (e.g., on a website, mobile app, etc.) over time and to determine a set of diverse advertisements for display on the website.

In some embodiments, to diversify the advertisements, the ads diversity module 750 may determine how often the same advertisement is selected for display based on the probability calculations produced by the distribution calculator 742 and/or the distribution collapse avoidance module 746. If the ads diversity module 750 determines the display rate of the same advertisement is higher than a certain threshold (e.g., constantly being displayed, such as 95% of the time relative to competing advertisements), then it may update the parameters used by the distribution calculator 742. For instance, the set of equations 14 may be updated and then used to determine and provide an advertisement for display.

In some embodiments, the ads diversity module 750 may compute similarity values for the advertisements of an advertisement repository, which the ads management module 740 can use to select a set of diverse advertisements from the repository to display in an application (e.g., on a webpage). The ads diversity module 750 may then determine user-action probability (e.g., purchase, buy, click-through, probability etc.) associated with each advertisement. For instance, the ads diversity module 750 may cooperate with the distribution calculator 742 to determine the user action probability associated with each advertisement. The ads management module 740 may then determine the set of diverse advertisements based on the similarity between the two or more advertisements and/or the user-action probability associated with each advertisement using the minimum redundancy maximum relevance (mRMR) algorithm, as discussed elsewhere herein. In some further embodiments, responsive to determining the set of diverse advertisements, the ads diversity module 750 may provide the set of diverse advertisements to the ads management module 740, which may in turn provide them for display to a user in an application. Additionally and/or alternatively, the ads management module 740 may store the data generated by it in a data store for later access and/or retrieval.

By way of example, a user (such as an advertiser, a business merchant, etc.) may want to simultaneously display 4 diverse advertisements from let's say 100 advertisements to a customer in an email. The ads diversity module 750 may then feed the samples representing user action probabilities (click probabilities, buy probabilities) associated with the 100 advertisements and similarity values between two or more advertisements among those 100 advertisements into an mRMR feature selection algorithm. The mRMR feature selection algorithm may output the 4 advertisements that have the highest user-action probabilities among other advertisements and which are at the same time also diverse. The ads diversity module 750 may then take those 4 advertisements and provide them to the ads management module 740 for display to the customer in the email.

Additional structure, acts, and/or functionality of the ads management module 740, the distribution calculator 742, the distribution collapse avoidance module 746, the revenue estimator 748, and the ads diversity module 750 are discussed further elsewhere herein, such as below with respect to at least FIGS. 8A-8G and 9.

Example Methods

Figure 8A:
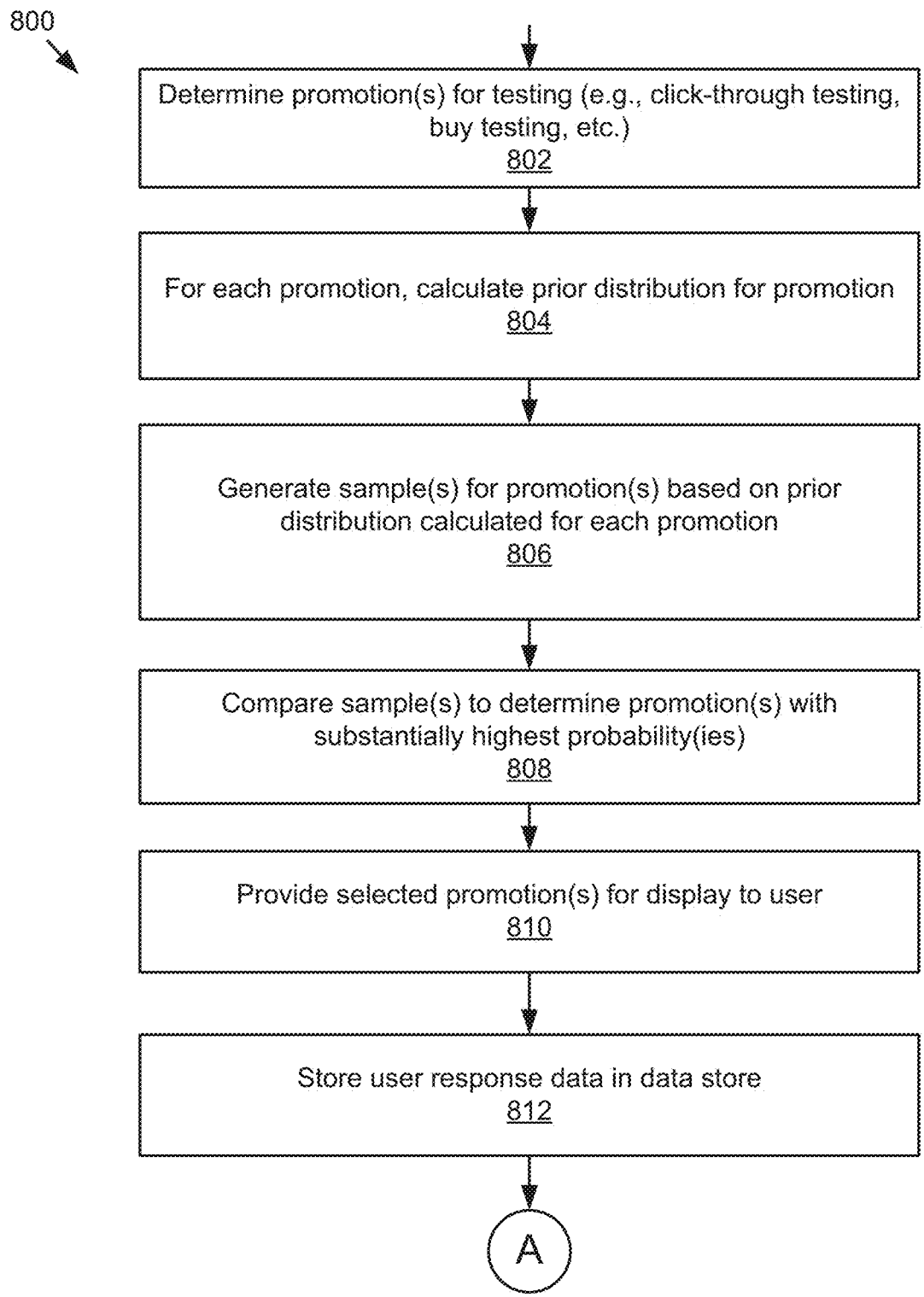
FIGS. 8A-8B are flowcharts of an example method for determining promotion(s) for display to a user.
Figure 8B:
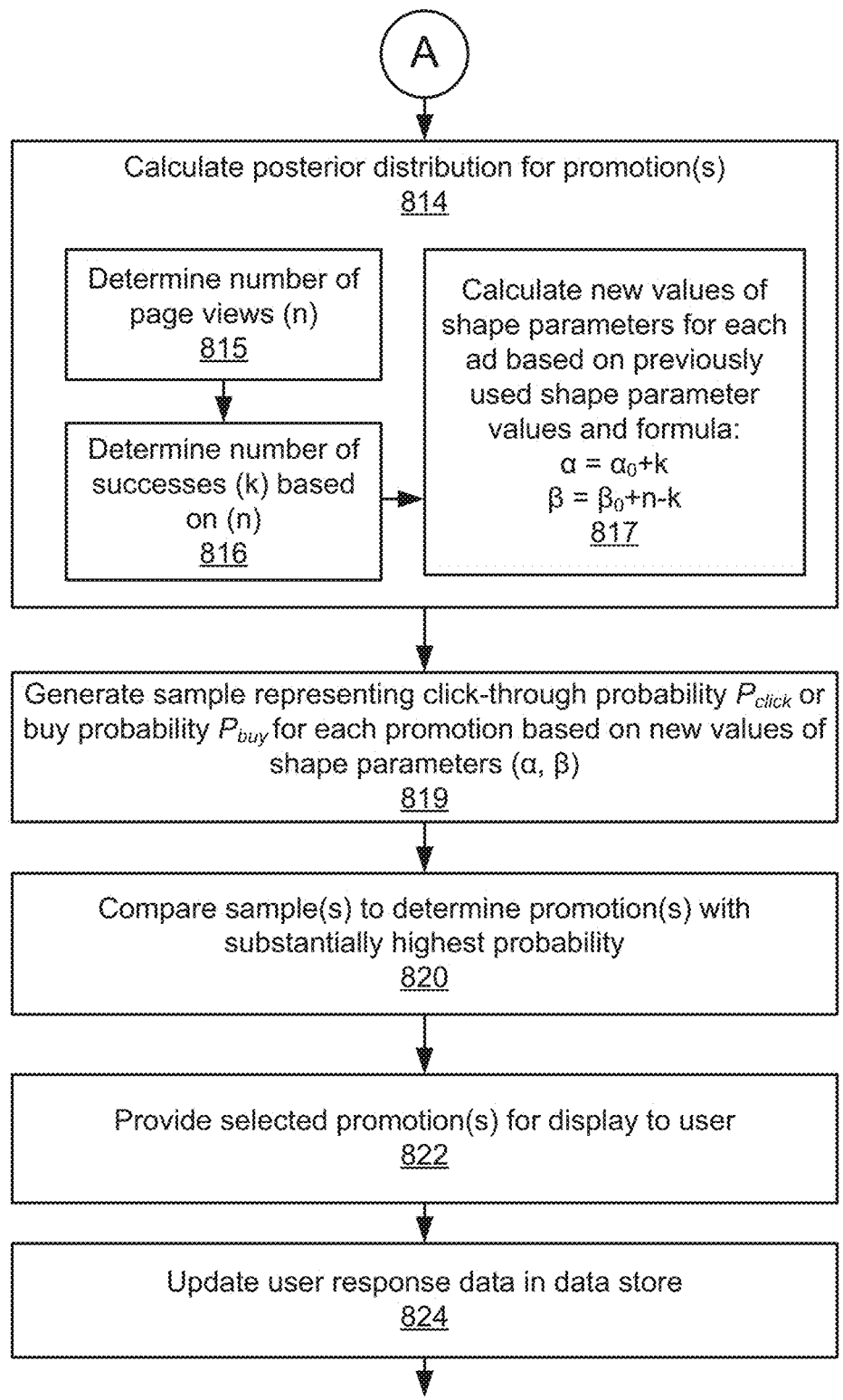

FIGS. 8A-8B are flowcharts of an example method 800 for determining promotion(s) for display to a user. The method 800 begins by determining 802 promotion(s) for product(s). These promotions may be selected to test their effectiveness in provoking user actions/responses in the computer application in which they are displayed (e.g., webpage), such as but not limited to click-through requests, buy requests, etc. In some embodiments, the ads management module 740 may determine the set of promotions randomly, based on one or more selection criteria, etc.

The method 800 continues by calculating 804 prior distribution(s) for the promotion(s). In some embodiments, the prior distribution of a given promotion may be calculated based on specific values of shape parameters $\alpha$ and $\beta$ at time t=0. In some embodiments, the distribution calculator 742 may calculate a prior distribution for a promotion based on certain knowledge, such as a previous knowledge of the expected click-through or buy rate of the customer accessing the page. The distribution calculator 742 may then set the values of shape parameters $\alpha$ and $\beta$ based on that previous knowledge. In some embodiments, there may not be any prior knowledge available and the distribution calculator 742 may then use the uninformative prior $P(\theta)=1$, which corresponds to shape parameter values of $\alpha_0=1$ and $\beta_0=1$, as shown, for example, in FIG. 1.

The method 800 may then determine 806 sample(s) (e.g., calculated probabilities) for the promotion(s) based on the prior distribution(s) calculated for the promotion(s). In some embodiments, each sample may represent a user-action probability, such as but not limited to the click-through probability $P_{click}$ or buy probability $P_{buy}$ for a corresponding promotion. The click-through probability $P_{click}$ for a promotion includes a probability describing how likely a user will click a promotion to view its contents. The buy probability $P_{buy}$ for a promotion includes a probability describing how likely a user will buy a certain product that is represented by the promotion.

The method 800 may compare 808 the sample(s) to determine promotion(s) with a certain (e.g., the highest, within a certain range, etc.) calculated probability (e.g., click-through rate(s), buy rate(s), etc.) and then provide 810 the selected promotion(s), e.g., promotion(s) with certain calculated probability(ies), for display to a user. The method 800 may also store 812 user response data (e.g., number of impressions or page views served for each promotion, click-through counts, conversion counts, etc.) used during the prior distribution calculation in a data store (e.g., the response database 618) for later access and/or retrieval.

In some embodiments, the operations in the blocks 806-812 are performed by the ads management module 740 in cooperation with the distribution calculator 742. For instance, the ads management module 740 may receive the samples representing user-action probabilities (e.g., click-through probabilities or buy probabilities) for the promotions (as calculated in block 806) from the distribution calculator 742, and may then perform the operations in blocks 808-812 based thereon.

In FIG. 8B, the method 800 calculates 814 posterior distribution(s) for the promotion(s). As discussed elsewhere herein, the posterior distribution associated with a promotion is a distribution of a user-action probability reflecting estimates for a user response to a display of the promotion for the product on a computing device of the user.

In some embodiments, the method 800 may determine 815 the number of times (n) a page associated with a promotion was served and viewed by users (also referred to simply as page views), and determine 816 the number of successes (k) representing user actions (e.g., click-through, purchase, etc.) that resulted from (n). For instance, the ads management module 740 may determine, for each promotion, the number of times to serve the promotion (e.g., on a particular page, set of pages, for a particular user or set of users, indiscriminately, etc.), and then upon serving the promotion and based on the number of times the promotion was served, determine the number of times the users actually selected (e.g., clicked, tapped, etc.) the promotion to view or buy a product associated with the promotion. By way of example, as shown in FIG. 2, the ads management module 740 may determine there were 5 successes on Ad A after being served 20 times to user(s) (e.g., a group of any users, a group of specific users, a certain user, etc.) and that there were 6 successes on Ad B after being served 30 times to the user(s).

The method 800 may then update the parameters used to calculate the posterior distribution. In some embodiments, the distribution calculator 742 may calculate 817 new values of shape parameters α and β for each promotion based on the shape parameter values used during prior distribution calculation and the number of views and successes (e.g. clicks) for each ad.

In some embodiments, the distribution calculator 742 may calculate the new shape parameter values using the following formula:

$$\alpha = \alpha_0 + k$$

$$\beta = \beta_0 + n - k$$

Where $\alpha_0$ and $\beta_0$ are the shape parameter values calculated during the calculation of the prior distribution. Here, the distribution calculator 742 increments the first shape parameter α by the number of observed successes (k) and increments the second shape parameter β by the number of observed failures (n–k).

The method 800 may then generate 819 sample(s) for the promotion(s) based on the posterior distributions calculated 814 for the promotion(s). As discussed elsewhere herein, a sample may represent a user-action probability (e.g., click-through probability, buy probability, etc.) for each promotion. In some embodiments, the distribution calculator 742 may generate the sample based on the shape parameter values calculated in block 817.

In blocks 820 and 822, the method 800, similar to operations described in blocks 808 and 810, may compare user-action probabilities of the promotions and select a promotion with a certain user-action rate. The method 800 may then provide the promotion with the certain user-action rate for display on the computing device of the user. By way of further example, the method 800 may compare the sample(s) of the promotion(s) to determine the promotion with a certain probability (e.g., highest click-through rate or buy rate) and provides the selected promotion(s) for display to the user.

In block 824, the method 800 may also store user response data used during the posterior distribution calculation in block 814 in the response database. For instance, the method 800 may update the user response data in the data store (e.g., the response database 618) and/or provide them to another component of the system 700.

In some embodiments, the operations in the blocks 814-824 are performed by the ads management module 740 in cooperation with the distribution calculator 742. For instance, the ads management module 740 may receive the samples representing user-action probabilities (e.g., click-through probabilities and/or buy probabilities) for the promotions (as calculated in block 818) from the distribution calculator 742, and may then perform the operations in blocks 820-824 based thereon.

Figure 9:
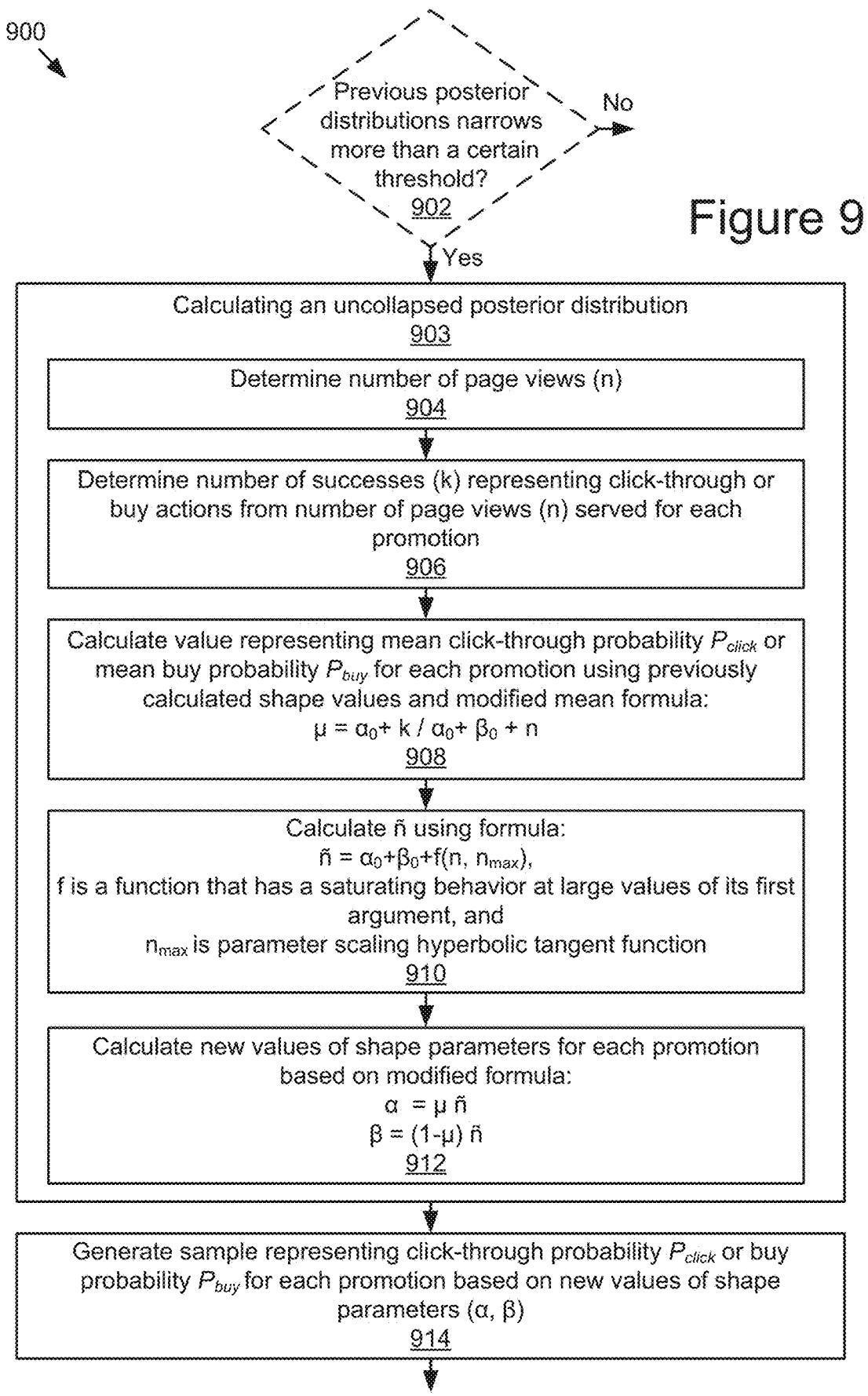
FIG. 9 is a flowchart of an example method for avoiding distribution collapse.

FIG. 9 is a block diagram of an example method 900 for avoiding distribution collapse. In block 902, the method 900 may determine whether the posterior distribution(s) (e.g., see above for the calculation of the posterior distribution(s)) have collapsed beyond (e.g., are narrower than) a certain threshold, as discussed elsewhere herein.

Responsive to determining the posterior distribution as collapsing in block 902, the method 900 may proceed to block 903 to perform distribution collapse avoidance. In some embodiments, the method 900 may calculate 903, using a set of formulas, an uncollapsed posterior distribution of the user-action probability reflecting modified estimates for the user response to the display of the promotion for the product on a computing device of the user, the set of formulas being adapted to prevent the uncollapsed posterior distribution from collapsing beyond the certain threshold.

In some embodiments, the method 900 may perform the distribution collapse avoidance by determining 904 the number of times (n) a page associated with a promotion was served and viewed by users, and determine 906 the number of successes (k) representing user actions (e.g., click-through, purchase, etc.) that resulted from (n). In some embodiments, these values may already be established from other operations (e.g., such as those discussed above with respect to blocks 815 and 816).

The method 900 may then determine updated samples for the promotions based on the prior distribution(s) calculated for the promotion(s). For instance, in some embodiments, the method 900 may calculate 908 a value representing a mean user-action probability (e.g., click-through probability $P_{click}$, buy probability $P_{buy}$, etc.) for each promotion using previously calculated shape parameter values.

More particularly for example, the distribution collapse avoidance module 746 may receive the previously used shape parameter values and the number of clicks and impressions from the distribution calculator 742 and then calculate the mean response rate for each promotion using the following modified formula to help avoid the posterior distribution associated with the promotion from collapsing:

$$\mu = \frac{\alpha_0 + k}{\alpha_0 + \beta_0 + n}$$

where $\alpha_0$ and $\beta_0$ are the previously used shaped parameters, n is the number of pages served/viewed for the promotion, and k is the number of successes out of the page views n.

The method 900 may then calculate 910 a variable n using the following formula:

$$\tilde{n} = \alpha_0 + \beta_0 + f(n, n_{max})$$

where $f$ is a function that has a saturating behavior at large values of its first argument and can be one of a $n_{max}$ tan h($n/n_{max}$) function, a min(max(0,n), $n_{max}$) function, and a $n_{max}$ erf($n/n_{max}$) function. Here, tan h is the hyperbolic tangent function, $n_{max}$ is a parameter that sets the scale for collapse avoidance mathematical transform, and erf is an error function.

Responsive to calculating the mean probability in block 908 and the variable in block 910, the method 900 may then calculate 912 new values for shape parameters α and β based on the sample and the variable ñ, and using the following formula:

$$\alpha = \mu \tilde{n}$$

$$\beta = (1-\mu)\tilde{n}$$

The above shape parameter values can be used during the calculation of subsequent set of posterior distributions. The method 900 may then generate 914 a sample representing $P_{click}$ or buy probability $P_{buy}$ for each promotion based on the new values of shape parameters (α, β) calculated in block 912.

Calculating the mean probability using the modified formula discussed above and the shape parameters values this way is advantageous as it can prevent the posterior distributions from collapsing as the total number of page impressions (n) increases over time. This also can prevent a distribution from becoming narrower than a Beta distribution associated with a promotion that receives $n_{max}$ impressions. In some embodiments, the operations of the method 900 are performed by the distribution calculator 742 in cooperation with the distribution collapse avoidance module 746 and/or other components, as discussed elsewhere herein.

The method 900 then may return to other operations, such as block 820 of method 800, where the newly computed samples are compared, and promotion(s) are selected for presentation to users, and/or the responses are stored. For instance, in some embodiments, the method 900 may determine whether to select the promotion from the promotion database for display on a computing device of the user based on the modified estimates for the user response to the display of the promotion for the product on a computing device of the user (e.g., in returning to block 820 or 822 of the method 800). Additionally or alternatively, the method 900 may store the uncollapsed posterior distribution of the user-action probability in a response database (e.g., in returning to block 824).

If the result of the determination in block 902 is negative, the method 900 may wait, terminate, and/or repeat another method or operation (e.g., by proceeding to block 814 of FIG. 8B).

Figure 10:
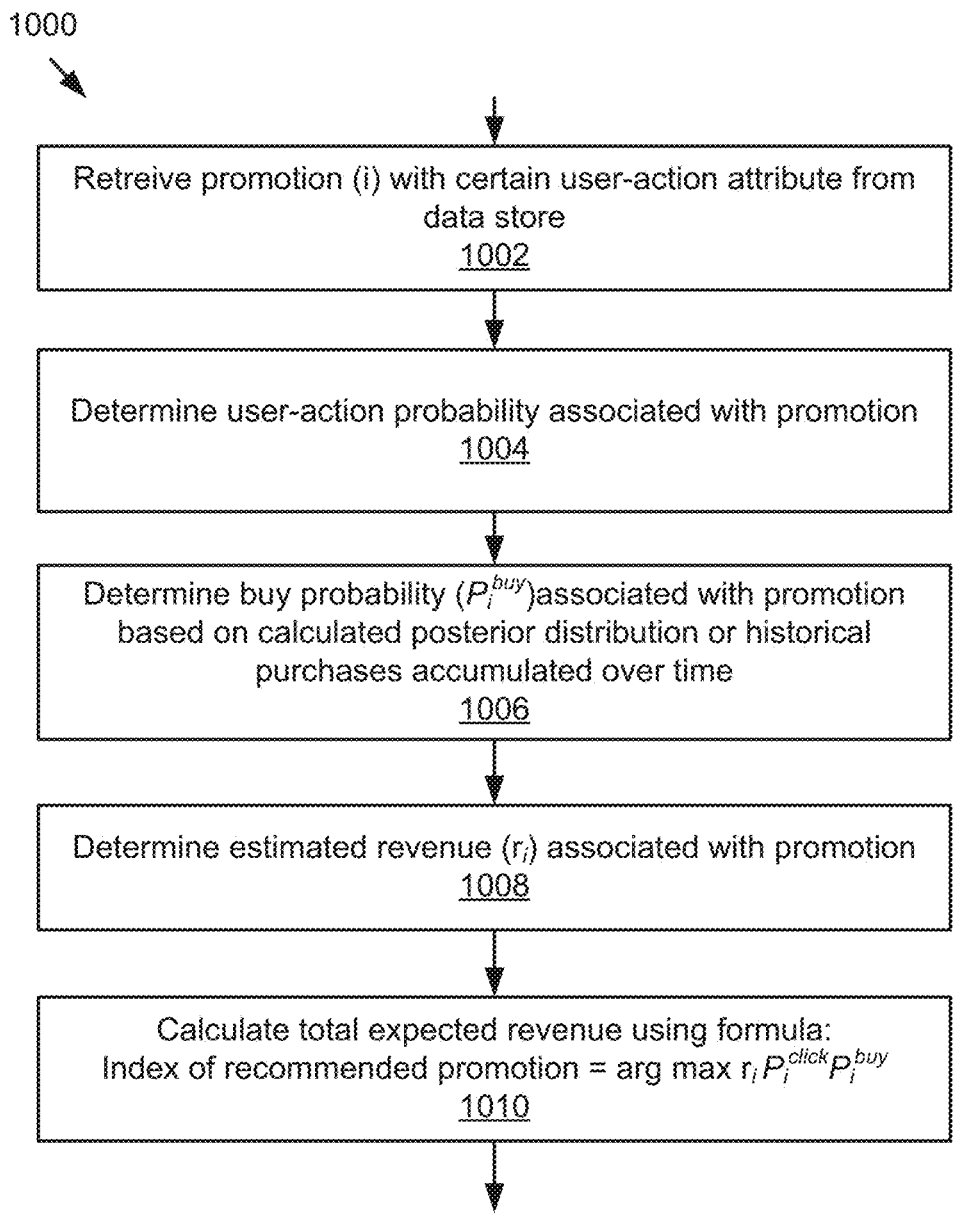
FIG. 10 is a flowchart of an example method calculating a certain estimated reward associated with a promotion, such as the total estimated revenue generatable from the promotion.

FIG. 10 is a block diagram of an example method 1000 for calculating a certain estimated reward associated with a promotion, such as the total estimated revenue generatable from an ad. For instance, the method 1000 may retrieve 1002 a promotion i with a certain user-action attribute (e.g., a certain (e.g., highest) click-through rate, buy rate compared to other promotions, etc.) from a data store. For instance but not limitation, promotions along with associated clickstream data describing user action attributes (e.g., click-through rate, buy rate, etc.) may be stored in the response database 618, as discussed elsewhere herein, and the revenue estimator 748 may access the response database 618 to retrieve the promotion with the corresponding user-action attribute(s), such as the highest click-through rate or buy rate stored therein.

Once the promotion is determined, the method 1000 may then determine in blocks 1004 and 1006 the click-through probability $P_i^{click}$ and the buy probability $P_i^{buy}$ associated with the promotion. For instance, revenue estimator 748 may cooperate with the distribution calculator 742, and/or the distribution collapse avoidance module 746 to determine the probability (as discussed with respect to at least methods 800 and/or 900) or may access the response database 618 to determine the probability stored therein.

The method 1000 continues by determining 1008 the estimated revenue $r_i$ associated with the promotion. In some embodiments, a corresponding amount of revenue may be associated with each promotion and stored in a data store, and the revenue estimator 748 may access the data store to determine the revenue $r_i$ associated with the promotion. The method 1000 may then calculate 1010 a total estimated revenue obtainable from presentation of the promotion based on the revenue $r_i$, click-through probability $P_i^{click}$ and the buy probability $P_i^{buy}$ associated with the promotion. For instance, the revenue estimator 748 may determine the total expected revenue associated with the promotion using the following formula:

$$\text{Total expected revenue} = \arg\max r_i P_i^{click} P_i^{buy}$$

Figure 11A:
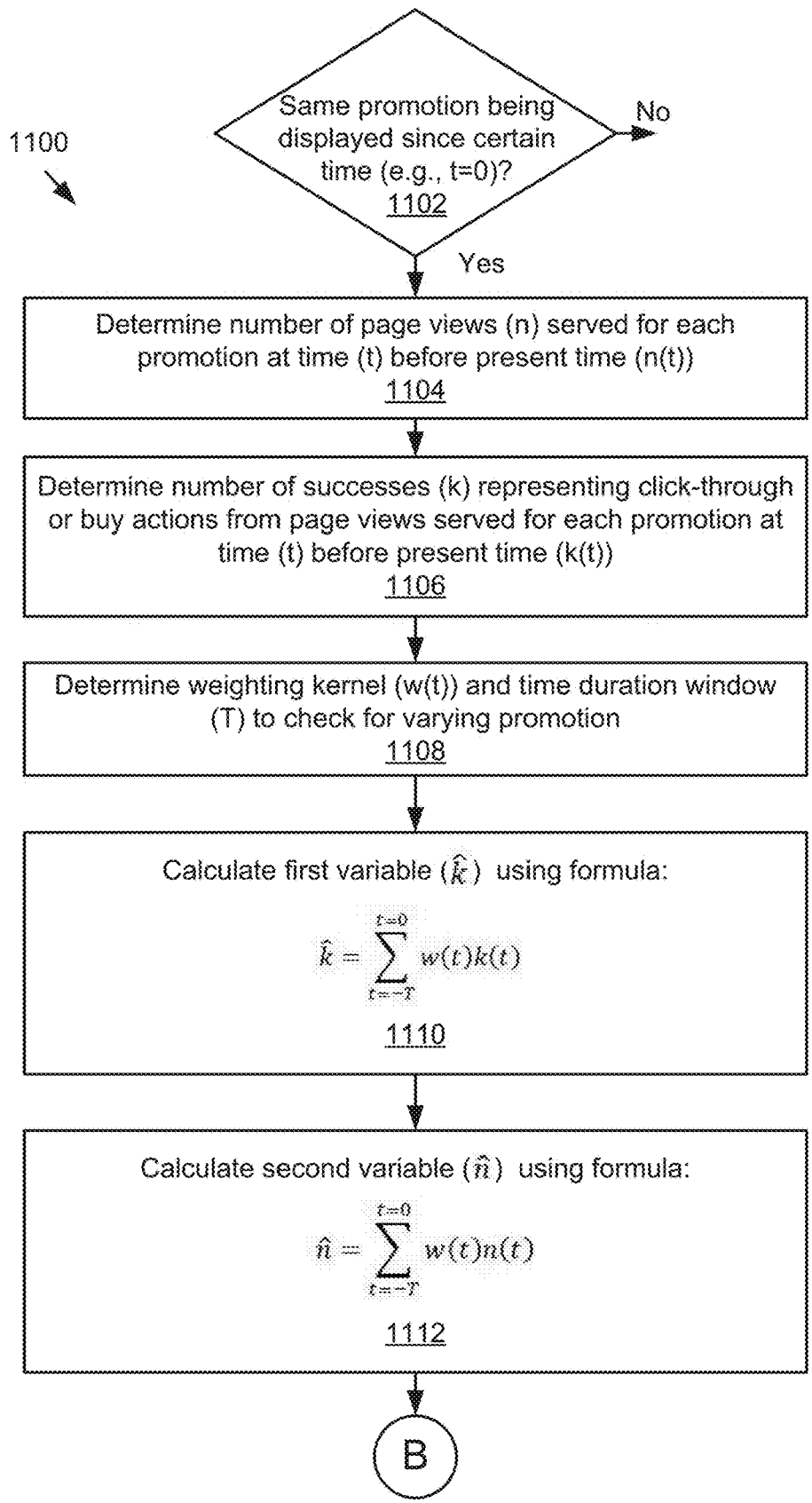
FIGS. 11A and 11B are flowcharts of an example method for preventing the same promotion from constantly being displayed.
Figure 11B:
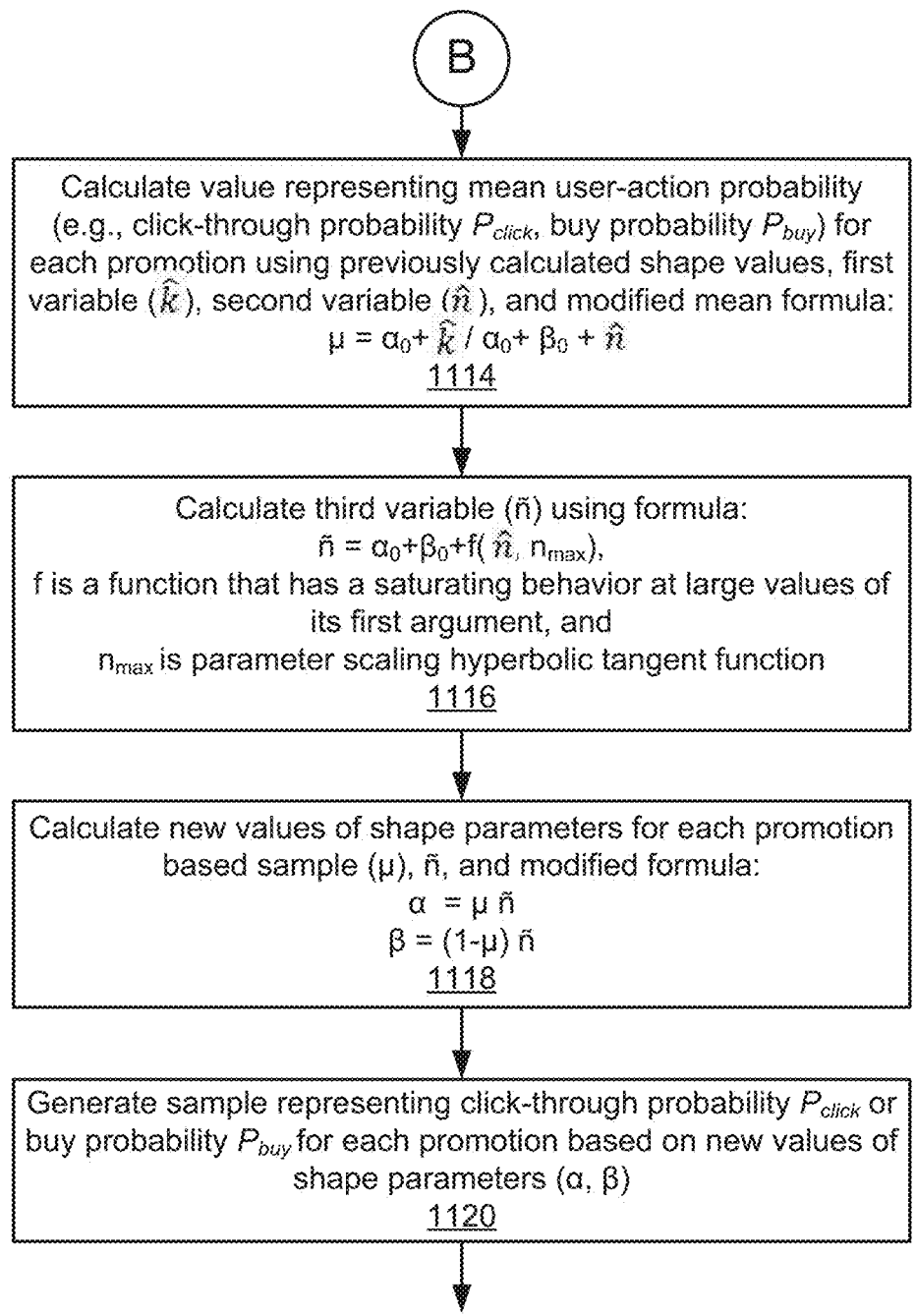

FIG. 11 is a block diagram of an example method 1100 for preventing the same promotion from constantly being displayed. As an overview, based on a set of promotions for products determined and retrievable from a promotion database and provideable for display to a user, the method 1100 may determine a number of page views for each of the promotions and the number of successes associated with each of the promotions representing user actions resulting from the page views of that promotion; determine that a same promotion is being selected for display since a certain amount of time based on the posterior distribution and the uncollapsed posterior distribution; responsive to determining that the same promotion is being selected for display, calculating a set of subsequent posterior distributions based on the posterior distribution, the uncollapsed posterior distribution, the number of page views respectively associated with the promotions, and the number of successes respectively associated with the promotions, the subsequent posterior including user-action probabilities reflecting estimates of user actions accounting for changes in user advertisement preferences. The method 1100 may then return to method 800 (e.g., 820, 822, etc.) to select a promotion with a certain user-action rate based on a comparison of the random samples generated from the subsequent posterior distributions and provide the promotion with the certain user-action rate for display on the computing device of the user.

By way of further non-limiting example, in some embodiments, the method 1100 may perform at least some of the above operations as follows. For instance, in block 1102, the method 1100 may determine whether the same promotion is being displayed to users again since a certain time (e.g., time t=0).

In some embodiments, the method 1100 may determine if the same promotion is consistently being determined as having the highest click-through rate or buy rate and provided for display more than an allowable, predetermined threshold. If the result of the determination is positive, then the method 1100 may proceed to determine varying promotions to display over a moving time window.

In block 1104, the method 1100 may determine the number of page views (n) that were served for each promotion at time t before a current or present time n(t) and determine in block 1106 the number of successes k representing click-through or buy actions from the page views that were served for each promotion at time t before the present time. For instance, the method 1100 may determine how many times each promotion was served on a particular website and how many times the promotion did actually received a click-through or a buy action from a customer before the present time. The number of successes k at time t before the present time is denoted as k(t).

The method 1100 may then determine in block 1108 a weighting kernel, denoted as w(t), and a duration of time window T to check for a varying promotion as discussed elsewhere herein. The method 1100 may calculate 1110 a first variable $\hat{k}$ and calculate 1112 a second variable $\hat{n}$ based on the weighting kernel, the number of successes before the present time (denoted as k(t)), the number of page views served before the present time (denoted as n(t)), and the following formulas:

$$\hat{k} = \sum_{t=-T}^{t=0} w(t)k(t)$$

$$\hat{n} = \sum_{t=-T}^{t=0} w(t)n(t)$$

The method 1100 continues by calculating 1114 a mean value representing a user-action probability (e.g., click-through probability, buy probability, etc.) for each promotion using shape parameter values used during a previous distribution calculation, the first $\hat{k}$, the second variable $\hat{n}$, and the following formula:

$$\mu = \frac{\alpha_0 + \hat{k}}{\alpha_0 + \beta_0 + \hat{n}}$$

The method 1100 may then calculate 1116 a third variable $\tilde{n}$ using the following formula:

$$\tilde{n} = \alpha_0 + \beta_0 + f(\hat{n}, n_{max})$$

where $f$ is a function that has a saturating behavior at large values of its first argument and can be one of a $n_{max}$ tan h($\hat{n}/n_{max}$) function, a min(max(0,$\hat{n}$), $n_{max}$) function, and a $n_{max}$ erf($\hat{n}/n_{max}$) function. Here, tan h is the hyperbolic tangent function, $n_{max}$ is a parameter that sets the scale for collapse avoidance mathematical transform, and erf is an error function.

Responsive to calculating the mean value in block 1114 and the third variable $\tilde{n}$ in block 1116, the method 1100 may then calculate 1118 new values of shape parameters $\alpha$ and $\beta$ based on the mean value and the variable $\hat{n}$, and using the following formula:

$$\alpha = \mu \tilde{n}$$

$$\beta = (1-\mu)\tilde{n}$$

The above shape parameter values can be used during the calculation of subsequent set of posterior distributions and for generating samples, as discussed elsewhere herein. Generating the samples and calculating the shape parameters values this way is advantageous as it can prevent the same promotion to be displayed over time. The method 1110 may then return to operations in the foregoing methods (e.g., 800, 900, etc.) to compare the samples of the promotions to determine a promotion with a certain rate (e.g., highest click-through rate or buy rate) and provide 824 the promotion for display to the user.

In some embodiments, the operations discussed with reference to the method 1100 may be performed by the ads diversity module 750 in cooperation with other modules of the system 700.

Figure 12:
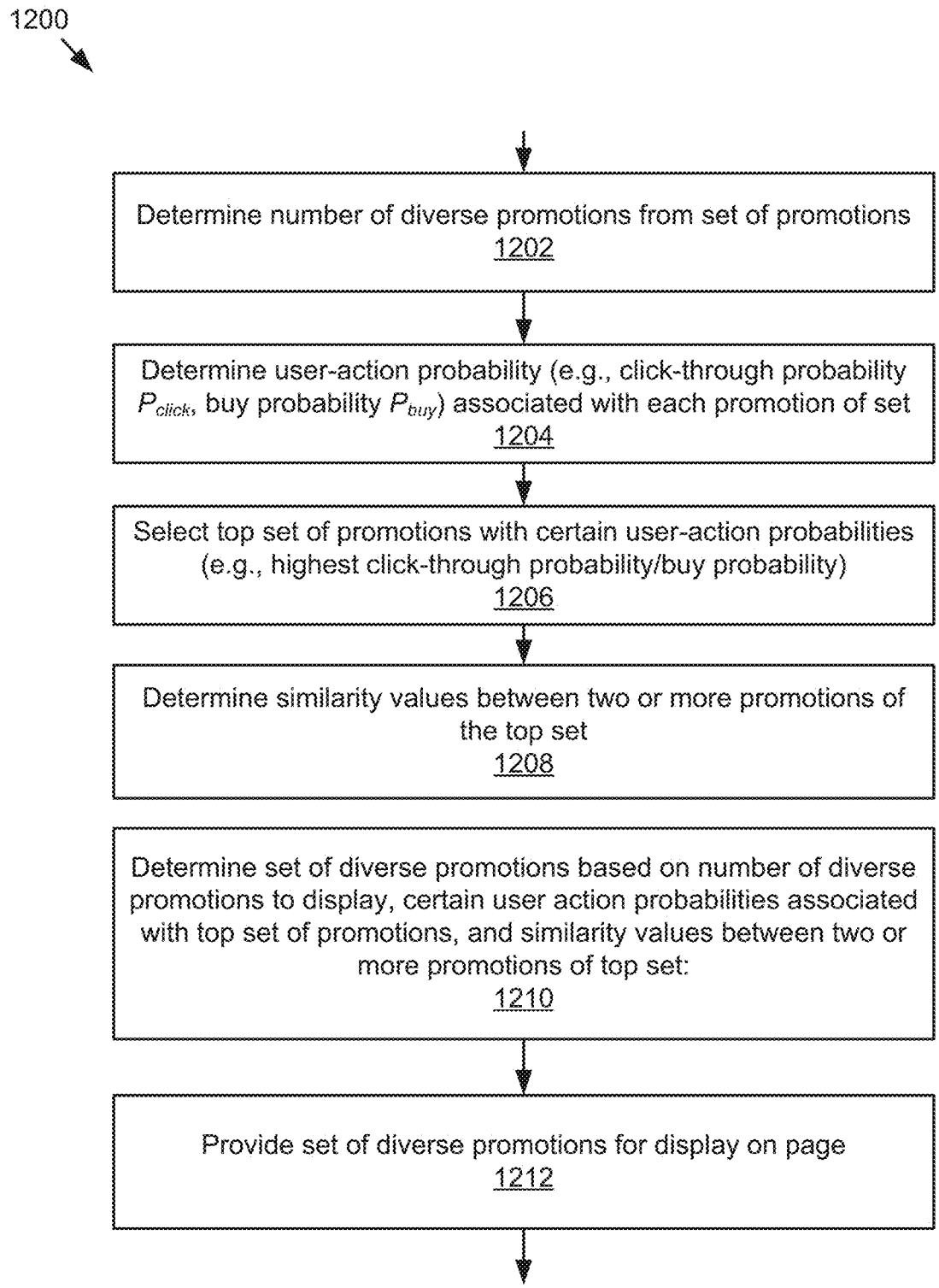
FIG. 12 is a flowchart of an example method for determining a set of diverse promotions (e.g., advertisements, offers, etc.) for display based on similarity between two or more promotions.

FIG. 12 is a flowchart of an example method 1200 for determining a set of diverse promotions (e.g., advertisements, offers, etc.) for display based on similarity between two or more promotions. In block 1202, the method 1200 may determine the number of diverse promotions from a set of promotions (e.g., relevant available promotions selectable from data storage) to display on a particular page of an application, such as a website or mobile app. For example, the number of diverse promotions to be displayed on the page can be two, three, four, or more. The method 1200 may then determine 1204 a user-action probability (e.g., click-through probability $P_{click}$, buy probability $P_{buy}$) associated with each promotion of the set. For instance, the ads diversity module 750 may cooperate with the distribution calculator 742 to determine the user-action probability, as discussed elsewhere herein.

The method 1200 continues by selecting 1206 a set of promotions with certain user-action probabilities (e.g., as having highest click-through or buy probabilities among other competing promotions). For example, the method 1200 may select top 10 promotions from a set of 100 promotions that have click-through/buy probabilities higher than a certain threshold probability. The method 1200 may then determine 1208, from the top set of promotions, similarity values between the promotions, such as between the two promotions i and j.

Once the number of diverse promotions to display, the certain user-action probabilities associated with the top set of promotions, and the similarity values between two or more promotions of the top set are determined, the method 1200 may then determine 1210 and provide 1212 the set of diverse promotions for display. In some embodiments, the number of diverse promotions to display, the certain user-action probabilities associated with the top set of promotions, and the similarity values between two or more promotions of the top set are fed into a Minimum Redundancy Maximum Relevance (mRMR) algorithm, which may then determine 1210 the set of diverse promotions for display.

In the above description, for purposes of explanation, numerous specific details are set forth in order to provide a thorough understanding of the specification. It should be apparent, however, that the subject matter of the disclosure can be practiced without these specific details. In other instances, structures and devices are shown in block diagram form in order to avoid obscuring the description. For example, the present subject matter is described in an embodiment primarily with reference to user interfaces and particular hardware. However, the present subject matter applies to any type of computing system that can receive data and commands, and present information as part of a mobile device.

Reference in the specification to "one embodiment", "some embodiments", or "an embodiment" means that a particular feature, structure, or characteristic described in connection with the embodiment is included in one or more embodiments of the description. The appearances of the phrase "in one embodiment" or "in some embodiments" in various places in the specification are not necessarily all referring to the same embodiment(s).

Some portions of the detailed descriptions described above are presented in terms of algorithms and symbolic representations of operations on data bits within a computer memory. These algorithmic descriptions and representations are the means used in the data processing arts to most effectively convey the substance of their work to others. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The subject matter of the present description can take the form of an entirely hardware embodiment or an embodiment containing both hardware and software elements. In some embodiments, the subject matter may be implemented using software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the present subject matter has been presented for the purposes of illustration and description. It is not intended to be exhaustive or to limit the present embodiment of subject matter to the precise form disclosed. Many modifications and variations are possible in light of the above teaching. It is intended that the scope of the present embodiment of subject matter be limited not by this detailed description, but rather by the claims of this application. As will be understood by those familiar with the art, the present subject matter may be embodied in other specific forms without departing from the spirit or essential characteristics thereof. Likewise, the particular naming and division of the modules, routines, features, attributes, methodologies and other aspects are not mandatory or significant, and the mechanisms that implement the present subject matter or its features may have different names, divisions and/or formats. Furthermore, it should be understood that the modules, routines, features, attributes, methodologies and other aspects of the present subject matter can be implemented using hardware, firmware, software, or any combination of the three. Also, wherever a component, an example of which is a module, of the present subject matter is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present subject matter is in no way limited to implementation in any specific programming language, or for any specific operating system or environment.

What is claimed is:

1. A computer-implemented method comprising:
    determining, using one or more computing devices, a promotion for a product, the promotion being retrievable from a promotion database and providable for display to a user;
    receiving, using one or more computing devices, clickstream data reflecting past displays of the promotion to past users;
    storing, using one or more computing devices, the clickstream data in at least one memory for the promotion;
    iteratively calculating, using one or more computing devices and for the promotion, a posterior distribution of a user-action probability for each iteration using at least one processor that accesses the clickstream data stored in at least one memory for the promotion, wherein the user-action probability reflects estimates for a user response to a future display of the promotion for the product on a computing device of the user;
    automatically determining, by one or more computing devices, whether the posterior distribution is collapsing beyond a certain threshold for each iteration using at least one processor to compare the posterior distribution for each iteration to the certain threshold;
    responsive to at least one processor determining the posterior distribution for an iteration is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold;

determining by at least one processor whether to select the promotion from the promotion database for display on a computing device of the user based on the modified estimates for each iteration;

responsive to determining to select the promotion from the promotion database, transmitting the promotion to the computing device of the user; and selectively displaying the promotion on the computing device of the user in response to determining whether to select the promotion for each iteration.

2. A computing system comprising:

one or more computing devices, including one or more processors and one or more memories, configured to perform operations comprising:

determining a promotion for a product, the promotion being retrievable from a promotion database and providable for display to a user;

receiving clickstream data reflecting past displays of the promotion to past users;

storing the clickstream data in at least one memory for the promotion;

iteratively calculating for the promotion a posterior distribution of a user-action probability for each iteration using at least one processor that accesses the clickstream data stored in at least one memory for the promotion, wherein the user-action probability reflects estimates for a future user response to a display of the promotion for the product on a computing device of the user;

automatically determining whether the posterior distribution is collapsing beyond a certain threshold for each iteration using at least one processor to compare the posterior distribution for each iteration to the certain threshold;

responsive to at least one processor determining the posterior distribution for an iteration is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold;

determining by at least one processor whether to select the promotion from the promotion database for display on a computing device of the user based on the modified estimates for each iteration;

estimating by at least one processor a total estimated revenue generated from the promotion with a certain user-action rate that is provided for display to the user, wherein estimating the total estimated revenue includes:

determining by at least one processor an estimated revenue associated with the promotion; and calculating by at least one processor the total estimated revenue generated from the promotion using based on a product of the estimated revenue and one or more of a click-through probability and a buy probability associated with the promotion; and responsive to determining to select the promotion from the promotion database, transmitting the promotion to the computing device of the user, wherein the computing device selectively displays the promotion on the computing device of the user in response to the one or more computing devices determining whether to select the promotion for each iteration.

3. The computing system of claim 2, wherein determining the promotion for the product includes determining a set of two or more promotions for products, which includes the promotion for the product and one or more other promotions for other products, and the operations further comprise:

calculating for each of the one or more other promotions, using the one or more computing devices, a posterior distribution of a user-action probability reflecting estimates for the user response to a display of that promotion for a product promoted by the promotion on a computing device of the user, storing the posterior distribution of each of the one or more other promotions in the response database, wherein determining whether to select the promotion from the promotion database for display on the computing device of the user based on the modified estimates includes:

comparing samples representing user-action probabilities of the promotions which are generated from the posterior distributions, selecting a promotion with a user-action rate, and providing the promotion with the certain user-action rate or buy rate for display on the computing device of the user.

4. A computing system comprising:

one or more computing devices, including one or more processors and one or more memories, configured to perform operations comprising:

determining a promotion for a product, the promotion being retrievable from a promotion database and providable for display to a user;

receiving clickstream data reflecting past displays of the promotion to past users;

storing the clickstream data in at least one memory for the promotion;

iteratively calculating for the promotion a posterior distribution of a user-action probability for each iteration using at least one processor that accesses the clickstream data stored in at least one memory for the promotion, wherein:

the user-action probability reflects estimates for a future user response to a display of the promotion for the product on a computing device of the user; and calculating the posterior distribution includes:

determining by at least one processor a number of successes (k) representing a user action that resulted from a certain number (n) of times the promotion was served by a webserver for viewing, and calculating by at least one processor values for shape parameters $(\alpha,\beta)$ of the posterior distribution based on previously calculated values for shape parameters $(\alpha 0, \beta 0)$ used during a prior distribution calculation and a formula: $\alpha=\alpha 0+k$ and $\beta=\beta 0+_{n-k}$;

automatically determining whether the posterior distribution is collapsing beyond a certain threshold for each iteration using at least one processor to compare the posterior distribution for each iteration to the certain threshold;

responsive to at least one processor determining the posterior distribution is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold;

determining by at least one processor whether to select the promotion from the promotion database for display on a computing device of the user based on the modified estimates for each iteration; and responsive to determining to select the promotion from the promotion database, transmitting the promotion to the computing device of the user, wherein the computing device selectively displays the promotion on the computing device of the user in response to the one or more computing devices determining whether to select the promotion for each iteration.

5. A computing system comprising:

one or more computing devices, including one or more processors and one or more memories, configured to perform operations comprising:

determining a promotion for a product, the promotion being retrievable from a promotion database and providable for display to a user;

receiving clickstream data reflecting past displays of the promotion to past users;

storing the clickstream data in at least one memory for the promotion;

iteratively calculating for the promotion a posterior distribution of a user-action probability for each iteration using at least one processor that accesses the clickstream data stored in at least one memory for the promotion, wherein the user-action probability reflects estimates for a future user response to a display of the promotion for the product on a computing device of the user;

automatically determining whether the posterior distribution is collapsing beyond a certain threshold for each iteration using at least one processor to compare the posterior distribution for each iteration to the certain threshold;

responsive to at least one processor determining the posterior distribution is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold and including:

determining by at least one processor a number of successes (k) representing a user action that resulted from a certain number (n) of times the promotion was served by a webserver for viewing, calculating by at least one processor a value representing a mean user-action probability for the promotion based on values for shape parameters used during the posterior distribution calculation and a formula included in the set of formulas: $\mu = \alpha 0 + k/\alpha 0 + \beta 0 + n$, calculating by at least one processor a variable (n) using formula: $\tilde{n} = \alpha 0 + \beta 0 + f(n, nmax)$, f being a function that has a saturating behavior at large values of its first argument and nmax being a value that sets a scale for the uncollapsed posterior distribution, and calculating by at least one processor values of shape parameters $\alpha$ and $\beta$ for a subsequent posterior distribution calculation for the promotion using a formula included in the set of formulas: $\alpha = \mu \tilde{n}$ and $\beta = (1-\mu)\tilde{n}$;

determining by at least one processor whether to select the promotion from the promotion database for display on a computing device of the user based on the modified estimates for each iteration; and responsive to determining to select the promotion from the promotion database, transmitting the promotion to the computing device of the user, wherein the computing device selectively displays the promotion on the computing device of the user in response to the one or more computing devices determining whether to select the promotion for each iteration.

6. The computing system of claim 5, wherein function f is one of a $n_{max} \tan h(n/n_{max})$ function, a $\min(\max(0,n), n_{max})$ function, and a $n_{max} \text{erf}(n/n_{max})$ function, tan h being a hyperbolic tangent function and erf being an error function.

7. A computing system comprising:

one or more computing devices, including one or more processors and one or more memories, configured to perform operations comprising:

determining a promotion for a product, the promotion being retrievable from a promotion database and providable for display to a user;

receiving clickstream data reflecting past displays of the promotion to past users;

storing the clickstream data in at least one memory for the promotion;

iteratively calculating for the promotion a posterior distribution of a user-action probability for each iteration using at least one processor that accesses the clickstream data stored in at least one memory for the promotion, wherein the user-action probability reflects estimates for a future user response to a display of the promotion for the product on a computing device of the user;

automatically determining whether the posterior distribution is collapsing beyond a certain threshold for each iteration using at least one processor to compare the posterior distribution for each iteration to the certain threshold;

responsive to at least one processor determining the posterior distribution is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold;

determining by at least one processor whether to select the promotion from the promotion database for display on a computing device of the user based on the modified estimates for each iteration; and responsive to determining to select the promotion from the promotion database, transmitting the promotion to the computing device of the user, wherein the computing device selectively displays the promotion on the computing device of the user in response to the one or more computing devices determining whether to select the promotion for each iteration.

8. A computing system comprising:
one or more computing devices, including one or more processors and one or more memories, configured to perform operations comprising:
determining a set of promotions for products retrievable from a promotion database and providable for display to a user;
receiving clickstream data reflecting past displays of the promotion to past users;
storing the clickstream data in at least one memory for the promotion;
iteratively calculating for the promotion a posterior distribution of a user-action probability for each iteration using at least one processor that accesses the clickstream data stored in at least one memory for the promotion, wherein the user-action probability reflects estimates for a future user response to a display of the promotion for the product on a computing device of the user;
automatically determining whether the posterior distribution is collapsing beyond a certain threshold for each iteration using at least one processor to compare the posterior distribution for each iteration to the certain threshold;
responsive to at least one processor determining the posterior distribution is collapsing, calculating, using at least one processor that executes a set of formulas, an uncollapsed posterior distribution of the user-action probability reflecting modified estimates for the future user response to the display of the promotion for the product on a computing device of the user, the set of formulas being adapted to prevent the uncollapsed posterior distribution from collapsing beyond the certain threshold;
determining by at least one processor whether to select the promotion from the promotion database for display on a computing device of the user based on the modified estimates for each iteration;
determining by at least one processor a number of page views for each of the promotions and a number of successes associated with each of the promotions representing user actions resulting from the page views of that promotion;
determining by at least one processor that a same promotion is being selected for display since a certain amount of time based on the posterior distribution and the uncollapsed posterior distribution;
responsive to determining by at least one processor that the same promotion is being selected for display, calculating a set of subsequent posterior distributions based on the posterior distribution, the uncollapsed posterior distribution, the number of page views respectively associated with the promotions, and the number of successes respectively associated with the promotions, the subsequent posterior including user-action probabilities reflecting estimates of user actions accounting for changes in user advertisement preferences;
automatically selecting by at least one processor a promotion with a certain user-action rate based on a comparison of random samples generated from the subsequent posterior distributions; and
responsive to determining to select the promotion with the certain user-action rate from the promotion database, transmitting the promotion to the computing device of the user, wherein the computing device selectively displays the promotion on the computing device of the user in response to the one or more computing devices determining whether to select the promotion for each iteration.

9. The computing system of claim 8, wherein selecting the promotion with the certain user-action rate includes comparing click-through or buy probabilities reflected by samples generated from the subsequent posterior distributions of the promotions to determine a promotion with the highest click-through rate or buy rate.

10. The computing system of claim 8, wherein T is the certain amount of time, the number of page views is n, the number of successes is k, and calculating the set of subsequent posterior distributions includes, for each of the posterior distributions:
determining a weighting kernel w,
calculating a first variable $\hat{k}$ based on w, k, and a formula: $\hat{k} = \Sigma_{t=-T}^{t=0} w(t)k(t)$, where w and k are variables dependent upon time t,
calculating a second variable $\hat{n}$ based on w, n, and a formula: $\hat{n} = \Sigma_{t=-T}^{t=0} w(t)n(t)$, where w and n are dependent upon time t, and
calculating for the promotion, a value ($\mu$) representing a mean user-action probability for that promotion based on previously calculated shape parameters values ($\alpha 0$, $\beta 0$) used during a previous distribution calculation, the first variable $\hat{k}$, the second variable $\hat{n}$, and a formula:

$$\mu = \frac{\alpha_0 + \hat{k}}{\alpha_0 + \beta_0 + \hat{n}},$$

calculating a variable ($\tilde{n}$) using formula: $\tilde{n} = \alpha 0 + \beta 0 + f(\hat{n}, nmax)$, f being a function that has a saturating behavior at large values of its first argument and nmax being a value that sets a scale for the posterior distribution, and
calculating values of shape parameters $\alpha$ and $\beta$ for a subsequent posterior distribution calculation for the promotion using a formula: $\alpha = \mu\tilde{n}$ and $\beta = (1-\mu)\tilde{n}$.

11. The computing system of claim 10, wherein function f is one of a $n_{max}$ tan h($\hat{n}/n_{max}$) function, a min(max(0,$\hat{n}$), $n_{max}$) function, and a $n_{max}$ erf($\hat{n}/n_{max}$) function, tan h being a hyperbolic tangent function and erf being an error function.

12. The computer-implemented method of claim 1, wherein the clickstream data includes a certain number (n) of times the promotion was served by a webserver for viewing.

13. The computing system of claim 7, wherein the clickstream data includes a certain number (n) of times the promotion was served by a webserver for viewing.

* * * * *